US010114668B2

(12) United States Patent
Brandwine et al.

(10) Patent No.: US 10,114,668 B2
(45) Date of Patent: *Oct. 30, 2018

(54) MANAGING PRIVATE USE OF PROGRAM EXECUTION CAPACITY

(71) Applicant: Amazon Technologies, Inc., Reno, NV (US)

(72) Inventors: Eric Jason Brandwine, Haymarket, VA (US); James Alfred Gordon Greenfield, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 505 days.

This patent is subject to a terminal disclaimer.

(21) Appl. No.: 14/584,808

(22) Filed: Dec. 29, 2014

(65) Prior Publication Data

US 2015/0121400 A1     Apr. 30, 2015

Related U.S. Application Data

(63) Continuation of application No. 12/686,273, filed on Jan. 12, 2010, now Pat. No. 8,924,982.

(51) Int. Cl.
| | |
|---|---|
| *G06F 9/50* | (2006.01) |
| *G06F 9/46* | (2006.01) |
| *G06Q 20/08* | (2012.01) |

(52) U.S. Cl.
CPC ............ *G06F 9/466* (2013.01); *G06F 9/5072* (2013.01); *G06Q 20/085* (2013.01)

(58) Field of Classification Search
CPC ...... G06F 9/466; G06F 9/5072; G06Q 20/085
(Continued)

(56) References Cited

U.S. PATENT DOCUMENTS

| | | | |
|---|---|---|---|
| 7,139,821 | B1 | 11/2006 | Shah et al. |
| 7,792,944 | B2 | 9/2010 | DeSantis et al. |

(Continued)

FOREIGN PATENT DOCUMENTS

| | | |
|---|---|---|
| JP | 2003-131892 A | 5/2003 |
| JP | 2004-508611 A | 3/2004 |

(Continued)

OTHER PUBLICATIONS

Extended European Search Report for International Patent Application No. PCT/US2011020665, dated May 7, 2015 (7 pgs.).

(Continued)

*Primary Examiner* — S. Sough
*Assistant Examiner* — Kimberly L Jordan
(74) *Attorney, Agent, or Firm* — Seed IP Law Group LLP

(57) ABSTRACT

Techniques are described for managing execution of programs, including using excess program execution capacity of one or more computing systems. For example, a private pool of excess computing capacity may be maintained for a user based on unused dedicated program execution capacity allocated for that user, with the private pool of excess capacity being available for priority use by that user. Such private excess capacity pools may further in some embodiments be provided in addition to a general, non-private excess computing capacity pool that is available for use by multiple users, optionally including users who are associated with the private excess capacity pools. In some such situations, excess computing capacity may be made available to execute programs on a temporary basis, such that the programs executing using the excess capacity may be terminated at any time if other preferred use for the excess capacity arises.

23 Claims, 10 Drawing Sheets

(58) Field of Classification Search
USPC .......................... 718/104; 709/201; 705/7.12
See application file for complete search history.

(56) References Cited

U.S. PATENT DOCUMENTS

| | | |
|---|---|---|
| 8,249,904 B1 | 8/2012 | DeSantis et al. |
| 8,739,170 B1 | 5/2014 | Gupta et al. |
| 2002/0083116 A1 | 6/2002 | Petrini et al. |
| 2006/0190605 A1 | 8/2006 | Franz et al. |
| 2006/0195508 A1 | 8/2006 | Bernardin et al. |
| 2007/0240160 A1 | 10/2007 | Paterson-Jones et al. |
| 2008/0080396 A1 | 4/2008 | Meijer et al. |
| 2009/0049443 A1 | 2/2009 | Powers et al. |
| 2010/0004930 A1* | 1/2010 | Strope ............... G10L 15/32 704/240 |
| 2010/0088205 A1 | 4/2010 | Robertson |
| 2011/0078705 A1 | 3/2011 | Maclinovsky et al. |

FOREIGN PATENT DOCUMENTS

| | | |
|---|---|---|
| JP | 2005-234637 A | 9/2005 |
| JP | 2006-523875 A | 10/2006 |
| JP | 2009-110347 A | 5/2009 |
| WO | 2009/157136 A1 | 12/2009 |

OTHER PUBLICATIONS

"What is Google App Engine?" retrieved Jul. 31, 2008, from http://code.google.com/appengine/docs/whatisgoogleappengine.html, 4 pages.

Jelling, J., "Your PC can Contribute with Google Compute," Sep. 29, 2004, retrieved Jul. 26, 2008, from http://www.webpronews.com/topnews/2004/09/29/your-pc-can-contribute-with-google-co . . . , 2 pages.

McDonald, P., "Announcing Open Signups, Expected Pricing, and two new APIs," Google App Engine Blog , May 28, 2008, retrieved Jul. 26, 2008, from http://googleappengine.blogspot.com/2008/05/announcing-open-signups-expected.html, 2 pages.

"On-Demand Enterprise: Sun to be Part of First Online Compute Exchange," Feb. 14, 2005, retrieved Aug. 18, 2008, from http://www.printthis.clickability.com/pt/cpt?action=cpt&title=On-Demand+Enterprise%3A+Sun+ . . . , 2 pages.

Bertrand et al., "Using the Resource Governor," Microsoft® SQL Server® 2008, SQL Server Technical Article, Jun. 2009, 70 pages.

* cited by examiner

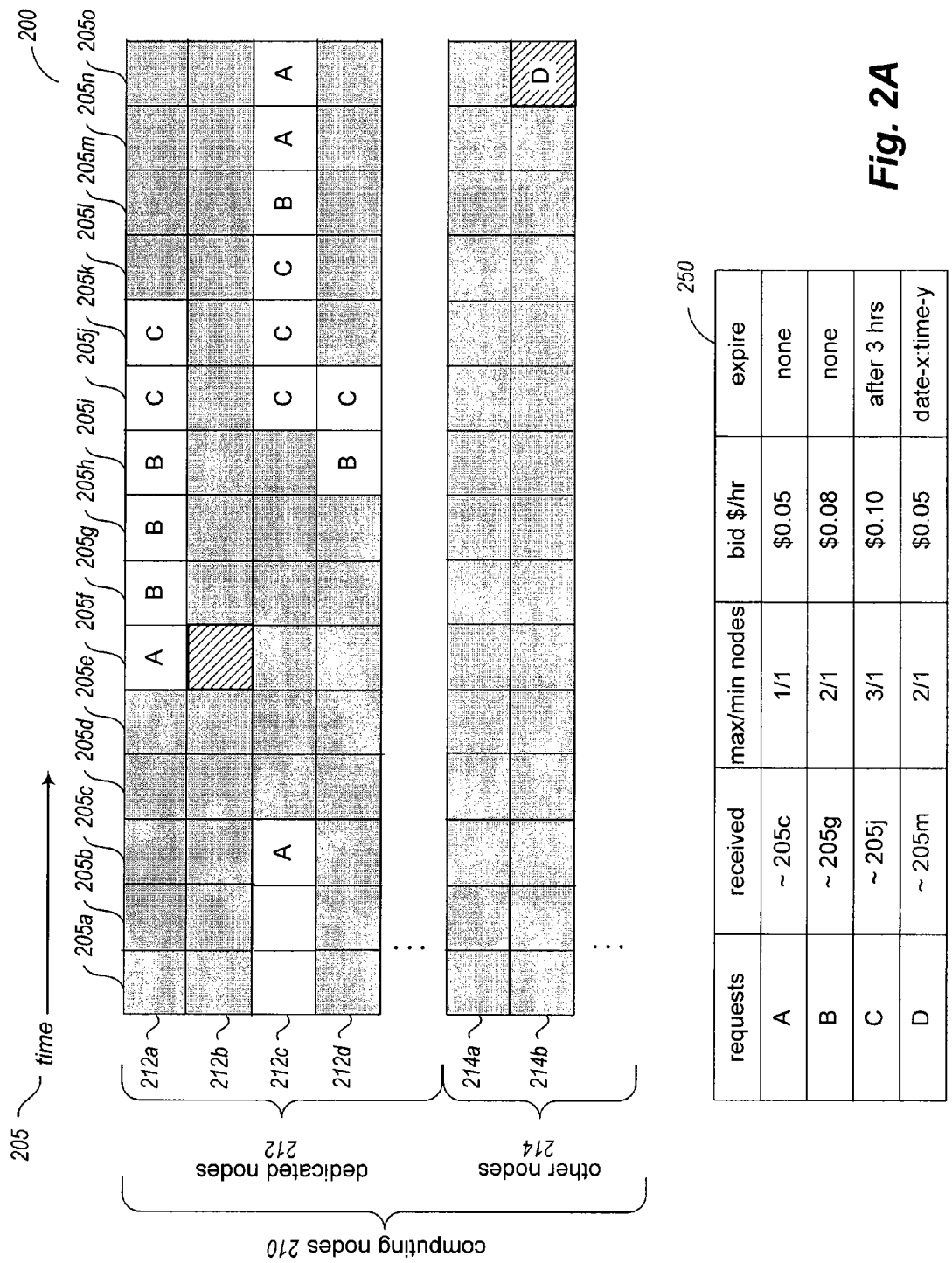

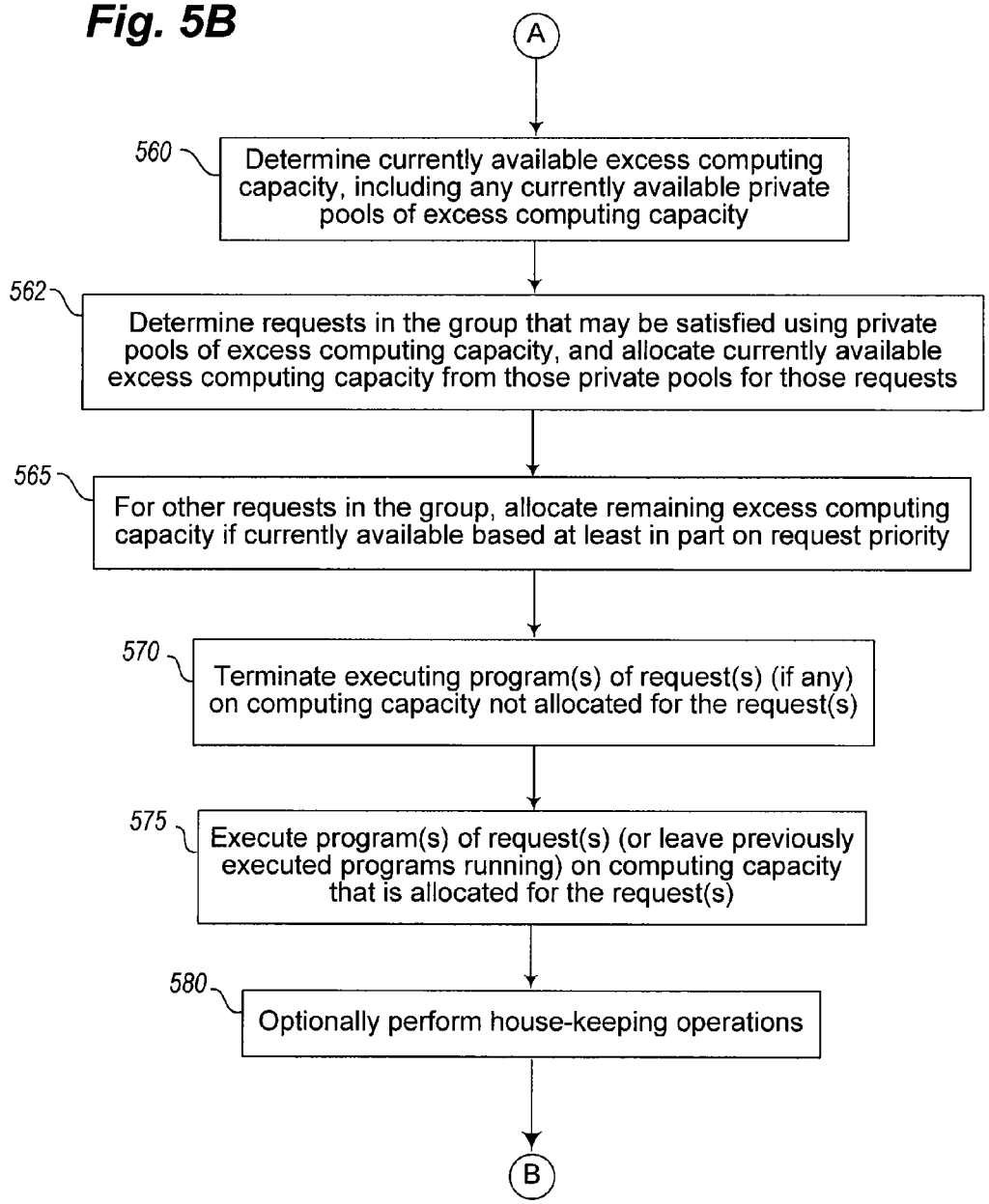

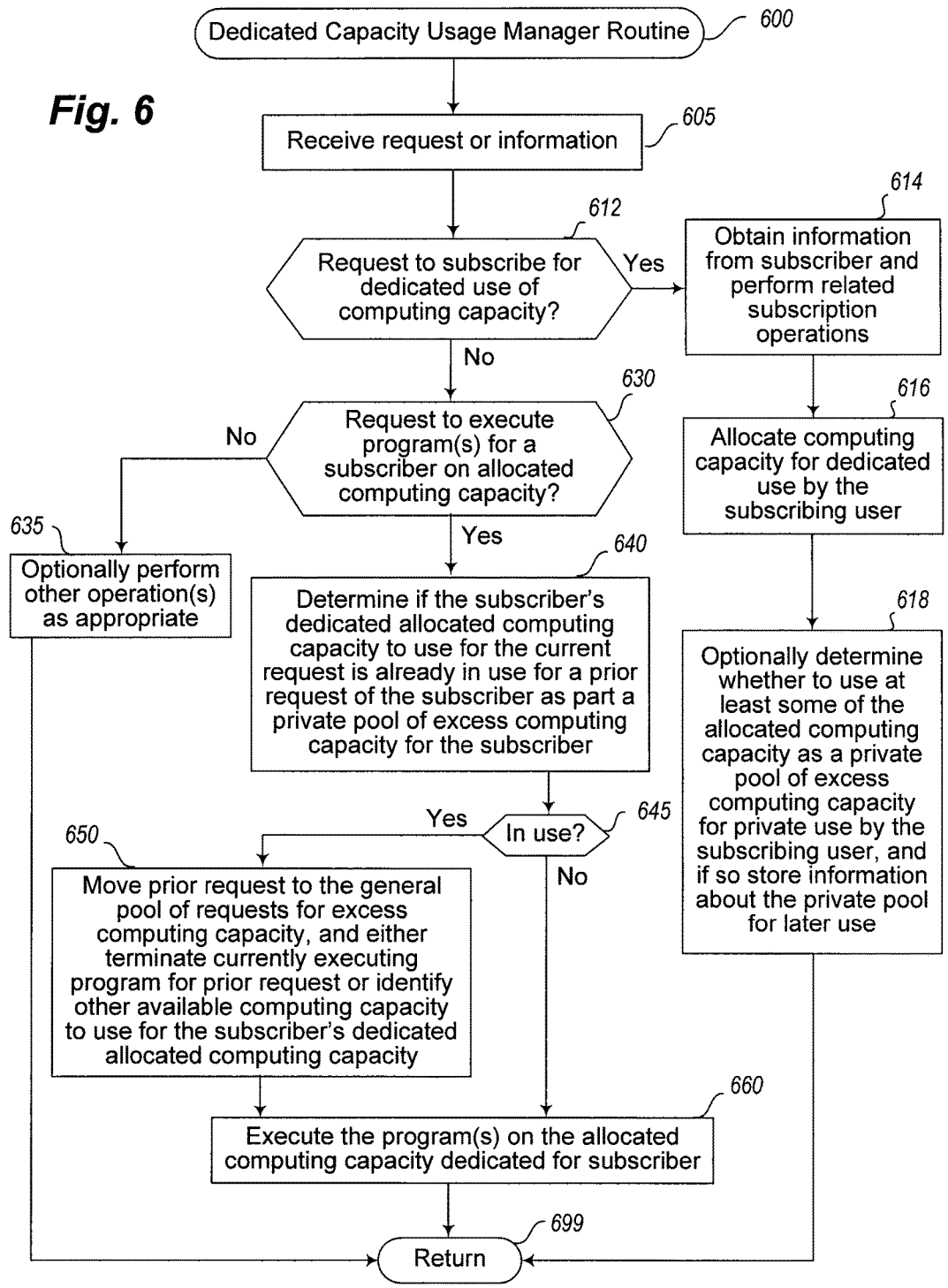

MANAGING PRIVATE USE OF PROGRAM EXECUTION CAPACITY

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided some benefits with respect to managing large-scale computing resources for many customers with diverse needs, allowing various computing resources to be efficiently and securely shared by multiple customers. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIGS. 2A and 2B illustrate examples of techniques for managing use of program execution capacity of multiple computing nodes.

FIGS. 5A and 5B illustrate a flow diagram of an example embodiment of an Excess Capacity Usage Manager routine.

FIG. 6 illustrates a flow diagram of an example embodiment of a Dedicated Capacity Usage Manager routine.

DETAILED DESCRIPTION

Figure 1A:
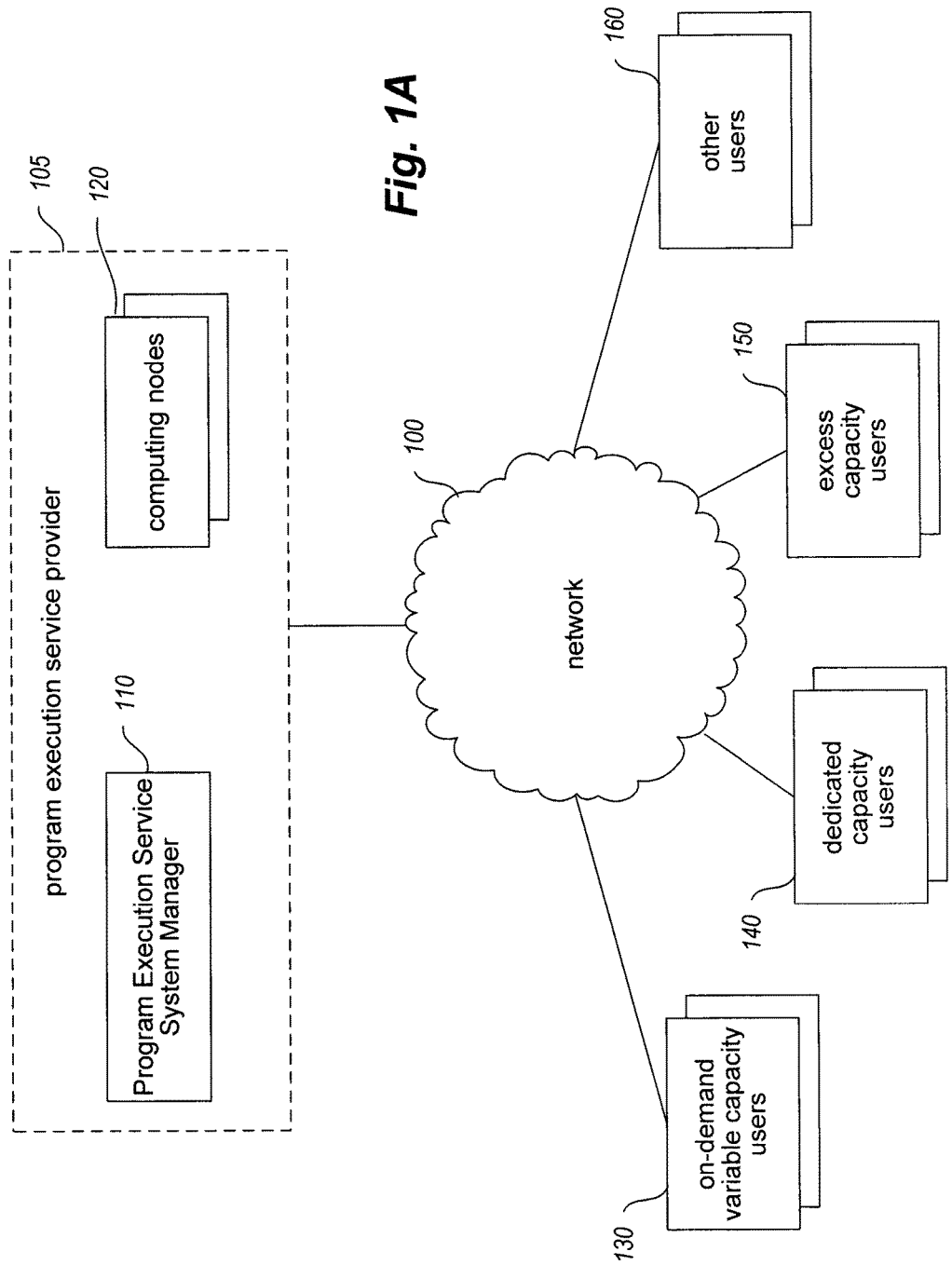
FIGS. 1A and 1B are network diagrams illustrating example embodiments of interactions to manage use of program execution capacity available to multiple users of a program execution service.

Techniques are described for managing execution of programs. In at least some embodiments, the execution of programs is managed for multiple users using excess computing capacity of one or more computing systems. In particular, in at least some such embodiments, for each of one or more users, a private pool of excess computing capacity is maintained for and associated with that user, such as based on currently unused program execution capacity that has been allocated for dedicated use by that associated user, and with the private pool of excess computing capacity being available for priority use by the associated user. Such private excess computing capacity pools may further in some embodiments be provided in addition to a general, non-private excess computing capacity pool that is available for use by multiple users, optionally including the one or more users who are associated with the private excess computing capacity pool(s). The techniques may in some embodiments be used in conjunction with a program execution service ("PES") that executes multiple programs on behalf of multiple customers or other users of the service, such as a program execution service that provides multiple computing nodes (e.g., multiple physical computing systems and/or virtual machines that are hosted on one or more physical computing systems) for executing user programs. In addition, in at least some embodiments, some or all of the techniques may be automatically performed by embodiments of a Program Execution Service System Manager module, as described in greater detail below.

In some embodiments, at least some excess or otherwise unused program execution capacity of a PES or other group of computing nodes may be made available to execute programs on behalf of users on a temporary or non-guaranteed basis, such that the excess program execution capacity may be available to execute such programs until a time that the program execution capacity is desired for other purposes (e.g., for preferential or reserved use to execute one or more other programs). Such excess program execution capacity may, for example, be made available as part of one or more general excess computing capacity pools that are available for use by various users (e.g., any customers of a PES that provides the general excess computing capacity pools), such as via a spot market with dynamically changing pricing to reflect supply and demand, or instead in other manners. In some cases, one or more programs may be executing on behalf of a user using excess program execution capacity at the time that the excess program execution capacity is desired for other purposes, and, in some such cases, the execution of those one or more programs may be automatically terminated (e.g., shut down, aborted, etc.) by the PES in order to make that excess program execution capacity available for the other purposes. In at least some such embodiments, programs that are automatically terminated may be automatically restarted on behalf of the user at a future time, such as a future time when a sufficient amount of excess program execution capacity again becomes available to execute the programs for the user. Alternatively, rather than terminating the one or more programs that are using excess program execution capacity that is desired for other purposes, in some embodiments and situations, other program execution capacity may be identified and used in place of the excess program execution capacity that is desired for the other purposes, so as to enable the one or more programs using the excess program execution capacity to continue to execute. Additional details related to using excess program execution capacity are included below.

In some embodiments, at least some of the program execution capacity available from a PES for executing programs may be allocated to one or more users for preferential use by those users, such that each of those users has priority access relative to other users to use a respective amount of the program execution capacity. For example, the priority access of the users may be based on each of the users having dedicated or exclusive access to use the respective amount of program execution capacity (e.g., each user having one or more dedicated computing nodes and/or portions thereof that are allocated for reserved or guaranteed use by the user in executing programs, or each user instead having an amount of program execution capacity that is equivalent to one or more computing nodes that is dedicated to the user to be available from a larger group of multiple computing nodes used by multiple users). In at least some such embodiments, a respective amount of program execution capacity of a PES may be allocated to a particular user for dedicated access over a specified period of time, such as in a manner analogous to a lease of one or more physical computing systems so that the respective amount of program execution capacity may be available for executing programs on behalf of the user throughout the specified period of time. In addition, in some embodiments, a user may be given preferential or other dedicated access to execute programs based on one or more factors, such as fees paid by the user, an agreement to a contractual obligation for using the dedicated access for a period of time and/or subject to other conditions, etc.

In at least some embodiments, at least some of the program execution capacity that is allocated to one or more users for dedicated or other preferential use may be used as excess program execution capacity during some times, such as when the allocated dedicated capacity is not being used for a preferential use and/or when the user to whom the dedicated capacity is allocated makes the allocated dedicated capacity available for use as excess capacity. In this manner, at least some program execution capacity that is allocated to a first group of users may become available from time to time to temporarily execute programs on behalf of other users. When the demand for excess program execution capacity from multiple users is greater than the currently available supply, particular users and programs may be selected to use the excess program execution capacity in various ways. For example, in some embodiments, a user who requests excess program execution capacity to execute a program may be given priority over other such users based on one or more factors, such as fees offered and/or paid by the user, a time that a request to use the excess program execution capacity is submitted, a time at which or by which excess program execution capacity use is requested to start, an amount of time or a deadline by which excess program execution capacity use is requested to be completed, a type and/or amount of excess program execution capacity requested (e.g., a specified quantity of computing nodes), etc. Additional details related to the use of dedicated program execution capacity are included below.

In addition, as previously noted, one or more users may each have an associated private pool of excess computing capacity for which the user has exclusive or priority access in at least some embodiments. For example, if a user has dedicated computing capacity of one or more computing nodes, but is not currently using some or all of that dedicated capacity, the user may be given priority access to use that unused dedicated capacity as a private pool of excess computing capacity in executing programs for the user. In some embodiments, such a private pool of excess computing capacity for a user may be established in response to explicit instructions from the user (e.g., for a fee from the user), while in other embodiments some or all such users that have unused dedicated computing capacity may each automatically receive a private pool of excess computing capacity based on their unused dedicated computing capacity. Furthermore, if a user automatically receives a private pool of excess computing capacity using their own unused dedicated computing capacity, the user may in some embodiments be unaware of the private pool.

The use of such a private pool of excess computing capacity for a user may provide various benefits to the user in various embodiments and situations. For example, in some embodiments, the ongoing incremental cost for a user to make use of their dedicated computing capacity may be lower than the cost to the user to make use of a comparable amount of excess computing capacity from a general pool—if so, the cost to the user for using their own private pool of excess computing capacity may be set at a rate that is less than the cost of the use of the general pool (e.g., may be the same cost as the ongoing incremental cost for a user to make use of their dedicated computing capacity, may be between the ongoing incremental cost for a user to make use of their dedicated computing capacity and the higher cost of using excess computing capacity from the general pool, etc.). In addition, in some embodiments, a user may receive exclusive or priority access to the excess computing capacity in their own private pool, such that the user is able to immediately execute an excess computing capacity request using their private pool, even if that same request would not have sufficiently high priority to be immediately executed using a general excess computing capacity pool. Thus, use of such a private pool of excess computing capacity for a user to execute a program may provide beneficial program execution characteristics that differ from at least some other program execution characteristics occurring from use of a general excess computing capacity pool to execute the program, such as one or more of lower incremental cost of use of a specified amount of program execution capacity for a specified time interval, enhanced availability to obtain access to computing capacity from the private pool relative to the general pool, enhanced ability to continue execution of the program using computing capacity from the private pool relative to the general pool, etc.

As one specific example of use of a private excess computing capacity pool, a first user may initiate dedicated use of multiple computing nodes for a particular purpose, but maintain a portion of those multiple computing nodes in reserve (e.g., to reserve 20% of the total multiple computing nodes as backup for possible later use, such as to be able to automatically scale the computing nodes being used for the particular purpose in response to higher-than-expected computing load and/or to be able to replace any computing nodes being used for the particular purpose if they become unavailable)—in such situations, the computing nodes that are in reserve may be used as a first private pool of excess computing capacity for the first user while they are not being used for the particular purpose, but with those computing nodes that are in reserve being available to the first user for the particular purpose if they are later desired. As another specific example of use of a private excess computing capacity pool, a second user may initiate dedicated use of multiple computing nodes, but with all of the multiple computing nodes intended for use by the second user as a second private pool of excess computing capacity for the second user—the second private pool of excess computing capacity may then be used to fulfill requests from multiple entities associated with the second user (e.g., if the second user represents an organization, and the multiple entities are different groups or people within the organization; with the multiple entities being third-parties to which the second user sells access to the second private pool of excess computing capacity; etc.), such as in a manner similar to the techniques described herein for managing multiple requests from multiple users to use a general excess computing capacity pool. Furthermore, if the second private pool of excess computing capacity for the second user is used to fulfill requests from multiple entities, the management of those requests and that second private pool may in some embodiments be performed by a third-party operator of a PES and/or a Program Execution Service System Manager ("PESSM") module (e.g., for a fee charged to the second user), while in other embodiments the second user may obtain and use a PESSM module or otherwise be enabled to perform such actions on their own behalf. Moreover, in some embodiments, some or all of the dedicated capacity computing nodes that are used for a user may be provided by or otherwise managed by that user, such as, for example, if the first and/or second users noted above provide at least some of the computing nodes used for the first and second excess computing capacity pools, respectively.

If a user has a private pool of excess computing capacity and there is a separate general pool of excess computing capacity that is also available, the different excess computing capacity pools may be used in various manners. For example, if such a user makes a request to use excess computing capacity, the request may first be satisfied using that user's private pool if it has sufficient computing capacity for the request, and otherwise the request may be considered for satisfaction by the general excess computing capacity pool along with requests from other users. Similarly, if one or more first programs are being executed for such a user by using the user's private pool of excess computing capacity, and that excess computing capacity is desired by the user for other purposes (e.g., to execute one or more other second programs for the user as part of the user's dedicated computing capacity), the execution of the one or more first programs may in some embodiments automatically be moved to the general excess computing capacity pool (e.g., by continuing execution of the first programs without termination, such as by identifying and using other available computing capacity to serve as a replacement part of the user's dedicated computing capacity; by terminating execution of the first programs on one or more computing nodes that are part of the user's dedicated computing capacity, and initiating further execution of the first programs in an immediate or rapid manner using other computing nodes that are part of the general pool of excess computing capacity; by terminating execution of the first programs on one or more computing nodes that are part of the user's dedicated computing capacity, and placing a request for further execution of the first programs in a request queue along with other requests for use of the general excess computing capacity pool; etc.). Additional details related to the use of private excess computing capacity pools are included below.

In addition to the types of dedicated and excess computing capacity capabilities that are discussed above, a PES may further include on-demand variable program execution capacity that is available to satisfy at least some dynamically received requests of users to execute programs (e.g., immediately upon request of those users, at an indicated future time, at some time during an indicated future time period, etc.) in some embodiments, such that the one or more programs indicated by such a request may be executed if computing resources sufficient to satisfy the requested execution are available at (or near) the requested time, but without such a request being guaranteed to be satisfied (i.e., without sufficient computing resources being guaranteed to be available). For example, after an on-demand variable program execution capacity request is received to dynamically execute one or more programs on behalf of a user (e.g., for immediate execution), the one or more programs may be executed for the user if an appropriate amount of on-demand program execution capacity is currently available for executing those programs (e.g., if it is determined that there is a sufficient number of available computing nodes with resources to satisfy the request), and otherwise the request may be denied (or in some cases, postponed). Thus, in some such embodiments, such a request for on-demand variable program execution capacity may be unsuccessful, such as if the appropriate amount of program execution capacity is not available to execute the one or more programs at the time of the requested execution (e.g., if it is determined that there are not enough currently available computing nodes with sufficient resources to satisfy a request for immediate execution).

In some embodiments, the computing nodes used to provide the on-demand variable program execution capacity may be distinct from the computing nodes used to provide dedicated program execution capacity and/or from the computing nodes used to provide excess program execution capacity—thus, if some of the computing nodes used to provide the on-demand variable program execution capacity are not in use, in some embodiments they may be used to provide excess program execution capacity until on-demand variable program execution capacity requests are received, while in other embodiments they may not be used to provide such excess program execution capacity. In addition, in some embodiments, after an on-demand variable program execution capacity request for immediate (or scheduled) execution is satisfied and successfully initiates execution of one or more programs on behalf of a respective user, the ongoing use of the on-demand variable program execution capacity may be guaranteed to continue until some future time, such as a time of the respective user's choosing (e.g., based on an indication received from the respective user to terminate use of and/or release the program execution capacity) and/or a time based upon design by the user (e.g., the one or more programs executing on behalf of the user automatically terminate the execution, such as upon completion of a task or otherwise; an application and/or other user interacting with the one or more programs executing on behalf of the respective user terminates the execution, such as if the one or more programs executing for the respective user are provided for interactive use of others; etc.). Alternatively, in some embodiments, the guaranteed ongoing use of the variable program execution capacity may be subject to certain limitations, such as to be guaranteed that the PES will not preempt the use for other purposes, but not to be guaranteed against failure of the computing nodes executing the programs.

In addition, as previously noted, dedicated program execution capacity functionality of a PES may be available for one or more users in at least some embodiments, such that each of the one or more users may have some dedicated amount of program execution capacity that is allocated by the PES and guaranteed to be available for executing programs on behalf of the one or more users (e.g., a dedicated number of one or more computing nodes provided by the PES, a dedicated portion of the computing resources provided by a group of one or more of the computing nodes of the PES, etc.). For example, the guaranteed availability of the dedicated program execution capacity may be provided in conjunction with one or more QoS ("Quality Of Service")

criteria, such as that the dedicated program execution capacity will be available within a specified period of time after a request to initiate execution of an indicated program (e.g., a period of time that corresponds to terminating execution of other programs using excess computing capacity and to initiating execution of the indicated program). In contrast to the on-demand variable program execution capacity functionality and the excess program execution capacity functionality, a user of dedicated capacity functionality may have some specified amount of program execution capacity that is guaranteed to be available for executing programs on behalf of the user during a specified use period, barring unforeseen and/or occasional events rendering services of the PES unavailable (e.g., service failure, maintenance, etc).

Furthermore, in embodiments in which a PES provides two or more of dedicated computing capacity, excess computing capacity and on-demand variable computing capacity to users for fees, the fees associated with the different types of computing capacity may differ in various manners, such as to reflect associated availability guarantees and/or other factors. As one example, the overall cost for a user to make use of a particular amount of dedicated computing capacity may be higher than the cost to the user to make use of a comparable amount of on-demand variable computing capacity (if available), and that cost to the user to use the on-demand variable computing capacity may be higher than the cost to the user to make use of a comparable amount of excess computing capacity (if available) from a general pool—in some cases, however, the cost of using dedicated computing capacity may include a one-time or periodic fee that is not based on actual use, and a separate ongoing incremental cost for a user to make use of a particular amount of dedicated computing capacity for a particular amount of time, with that ongoing incremental cost for a particular amount of dedicated computing capacity use optionally being less than the cost for using a comparable amount of general excess computing capacity pool for that period of time. Furthermore, as noted above, costs for using a private excess computing capacity pool may differ from those of using a general excess computing capacity pool, such as to in some embodiments be the same as the ongoing incremental cost for dedicated computing capacity use. Additional details related to pricing and costs are included below.

FIG. 1A is a network diagram that illustrates an example of managing use of multiple types of program execution capacity to execute programs for multiple users. For illustrative purposes, some examples and embodiments are described below in which specific types of program execution capability are provided and managed in specific manners. These examples are provided for illustrative purposes and are simplified for the sake of brevity, and it will be appreciated that the inventive techniques may be used in a wide variety of other situations, only some of which are described below.

In the example of FIG. 1A, a number of users are interacting over a network 100 with an illustrated embodiment of a Program Execution Service System Manager module 110 to execute programs on one or more computing nodes 120 available for executing programs of the users, with the PESSM module 110 providing some or all of the functionality of a particular program execution service (not shown). In particular, in the illustrated embodiment, the PESSM module 110 and the computing nodes 120 are provided by a program execution service provider 105 as part of a provided program execution service, and the PESSM module 110 may execute on one or more computing systems (not shown). In this example, the program execution service provides a variety of functionality for managing execution of programs on the computing nodes 120 for various users.

Various remote users 130, 140, 150 and 160 may interact over the network 100 with the PESSM 110 in this example to configure and/or request various types of execution of programs on behalf of the users. In this example, the remote users include one or more dedicated capacity users 140, one or more excess capacity users 150, one or more on-demand variable capacity users 130, and optionally one or more other users 160, as discussed below. The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users. In still other embodiments, the network 100 may include one or more private networks with access to and/or from the Internet.

Figure 1B:
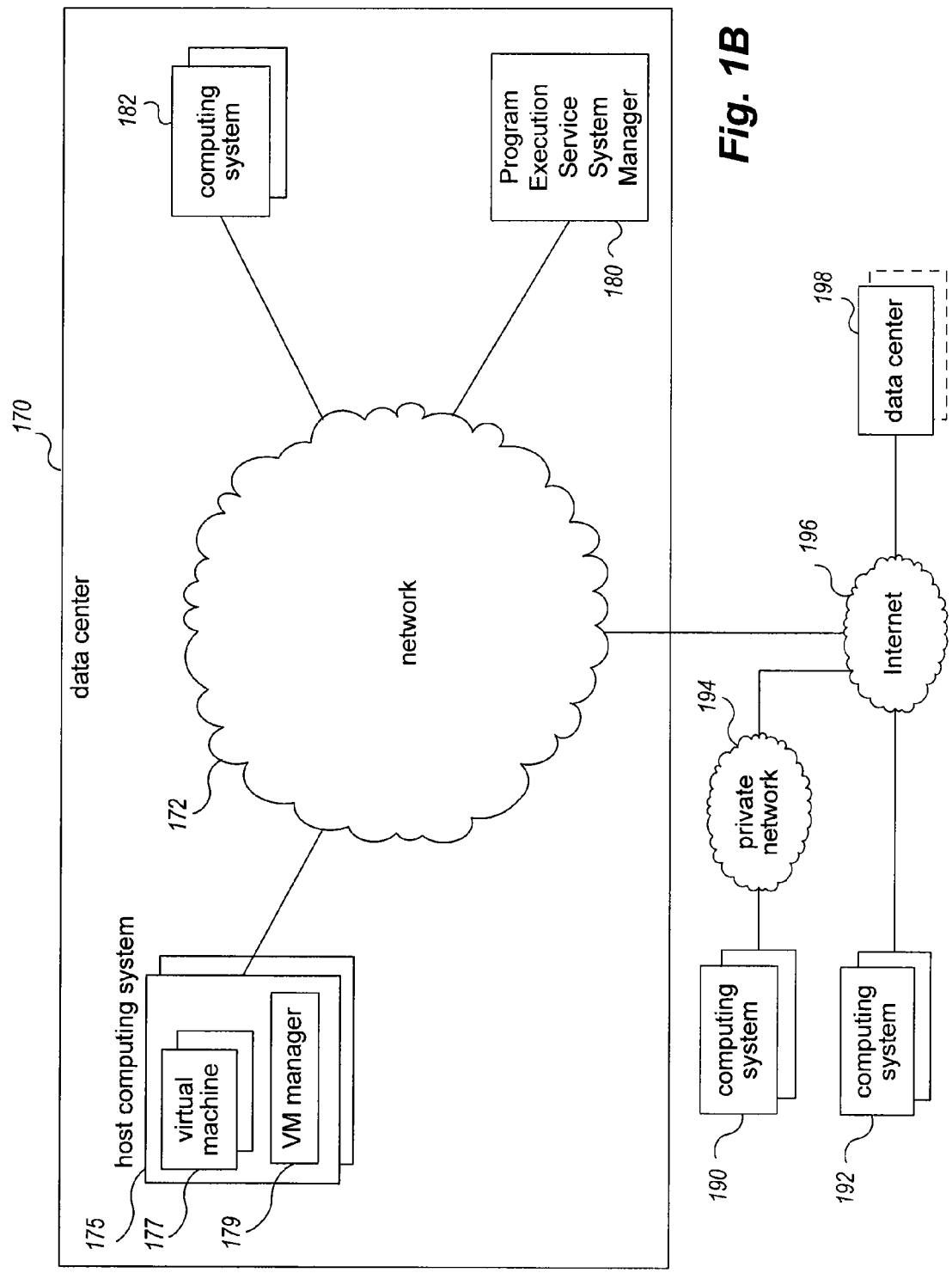

The illustrated computing nodes 120 are provided for use in executing programs on behalf of the users, and in some embodiments may include multiple physical computing systems and/or multiple virtual machines that are hosted on one or more physical computing systems (as is described in greater detail with respect to FIG. 1B). Each of the computing nodes 120 has some amount of computing resources available for executing one or more programs and provides a specific amount of program execution capacity, such as may be measured, for example, by a combination of one or more of processing capacity (e.g., number and/or size of processing units), memory capacity, storage capacity, network bandwidth capacity, etc. In some embodiments, the PES provider 105 may provide preconfigured computing nodes, with each preconfigured computing node having similar and/or equivalent amounts of resources available for executing programs on behalf of users, while in other embodiments, the PES provider 105 may provide a selection of various different computing nodes from which a user may choose for executing programs on behalf of the user, such as each selection having varying amounts and/or types of computing-related resources (e.g., size, speed and/or type of processing units; number of processing units; amount of memory and/or storage; platform configuration, such as 32-bit or 64-bit; etc.).

In some embodiments, the various users 130, 140, 150 and 160 may interact with the PESSM 110 to specify preferred and/or required resources for execution of programs on behalf of the users (e.g., by specifying one or more computing nodes, etc.). In various embodiments, such resources may be specified at the time of a request for execution of programs on behalf of a user and/or at one or more other times, such as when a user registers and/or subscribes to use services of the program execution service. In some embodiments, the PESSM 110 may provide subscription and/or registration services to one or more users, such that users may specify information related to one or more programs to execute on behalf of a user (e.g., programs, source code, addressable locations of one or more programs, etc.), account information (e.g., user name, billing information, etc.), terms of use, etc. In addition, after a user interacts with the PESSM 110 to subscribe and/or register for services, the user may in some embodiments be issued one or more identifiers (e.g., keys, tokens, user names, certificates, etc.) that are associated with the user and are used in conjunction with executing programs on behalf of the user. In other embodiments, a module other than the PESSM 110 may be provided to perform various operations related to subscription and/or registration services of a PES.

In the illustrated embodiment, one or more variable capacity users 130 are interacting with the PESSM 110 to configure and/or request execution of one or more programs using on-demand variable program execution capacity, such as by submitting a request for immediate execution and/or providing information for later execution. After a request for immediate execution is received, the PESSM 110 may determine whether there are a sufficient number of computing nodes 120 with available resources for satisfying the request, and if so, the PESSM 110 may initiate execution of one or more programs for the request on an appropriate amount of the computing nodes on behalf of the user. In cases where a user schedules a request for one or more future executions of one or more programs, the PESSM 110 may attempt to reserve an appropriate amount of computing nodes for executing the one or more programs at the one or more future times, and/or may delay the determination of which computing nodes to use for execution until a later time (e.g., such as when the one or more future times occur). In the illustrated embodiment, if the PESSM 110 is unable to allocate computing nodes for executing a variable capacity user request, the request may fail, such that the programs are not executed. In such cases, the user 130 may resubmit a failed request for later execution. As previously noted, in some embodiments, a variable capacity user may be charged various fees in association with use of the PES, such as based on a number of computing nodes used, a type of computing nodes used, a duration of time the computing nodes are used, etc. In addition, while not illustrated here, some portion of the computing nodes 120 may in some embodiments be specified to provide the on-demand variable program execution capacity, while in other embodiments the on-demand variable program execution capacity may be provided in other manners (e.g., using all of the computing nodes 120; using all of the computing nodes 120 that are not allocated for another purpose, such as for dedicated capacity; etc.).

In addition, in this example, a subset of the computing nodes 120 has been allocated for use by one or more of the dedicated capacity users 140, such that each of the one or more dedicated capacity users 140 may have priority access to execute programs for the user on at least some portion of those allocated computing nodes. For example, in some embodiments, each of the dedicated capacity users 140 may have one or more computing nodes 120 dedicated for executing programs of that user during a specified use time period, such that the user may access the one or more computing nodes at any time during the specified use period to execute programs on behalf of the user and/or may continuously execute programs on the one or more computing nodes for the duration of the specified period. As one specific example, one or more of the dedicated capacity users 140 may enter into a long-term (e.g., 1 year term) agreement with the PES provider 105, such that each of those users has priority access to a dedicated amount of the computing nodes 120 over the term of the agreement in exchange for a fixed fee payment (e.g., upfront or periodically billed) and, in some cases, other use fees (e.g., variable fees associated with use of various resources, such as electricity, physical rack space, network utilization, etc.).

After a dedicated capacity user 140 interacts with the PESSM 110 to request priority use of a dedicated amount of computing nodes, the PESSM 110 may allocate one or more computing nodes from the computing nodes 120 for dedicated use by the user. For example, in some embodiments, one or more specific computing nodes of the multiple computing nodes 120 (e.g., one or more specific physical computing nodes and/or virtual computing nodes) may be allocated for priority use by an associated specific dedicated capacity user for an entire use period (e.g., such as by allocating the specific computing nodes at the time of registration, and/or at one or more other times), such that requests to execute programs on behalf of the specific dedicated user on dedicated computing nodes during the use period results in initiation of execution of the programs on the specific one or more allocated computing nodes. In other embodiments, rather than allocate specific computing nodes to specific dedicated users 140 for an entire use period, the PESSM 110 may instead allocate computing nodes from a dedicated computing node group having multiple computing nodes, such that an appropriate amount of computing nodes with sufficient resources to satisfy requests for execution by the various dedicated capacity users 140 may be available in the dedicated computing node group. In some such embodiments, after a request is received to execute one or more programs for a dedicated user 140 on one or more dedicated computing nodes, an appropriate amount of computing nodes 120 sufficient to execute the programs may be selected from the dedicated computing node group at the time of the request to execute the one or more programs. After the selected amount of computing nodes are no longer used for executing the request for the dedicated user 140 (e.g., after termination and/or completion of the requested execution), those computing nodes may be returned to the dedicated computing node group for use by other dedicated capacity users, and in some embodiments may further be tracked as being available for use as part of a private pool of excess computing capacity for that dedicated user 140, as discussed below. In addition, after a use period for a particular dedicated capacity user 140 expires, the one or more computing nodes allocated for use by that user may similarly be released for use by others, such as by, for example, making the computing nodes available to be allocated for use by one or more other (e.g., new) dedicated capacity users. In addition, the PESSM 110 may perform one or more various other management operations with respect to fulfilling requests for execution, such as, for example, enforcing use periods and/or other restrictions associated with requests and/or users submitting requests, freeing-up computing resources to fulfill the requests, authorizing and/or authenticating the requests and/or the requesting users, etc. In some embodiments, a delay may be incurred between a time that a request for execution on dedicated program execution capacity and a time that the request is fulfilled, such as a delay period for performing various of the management operations, etc. In various other embodiments, computing nodes for dedicated capacity users may be allocated, tracked, reserved and/or released using various other techniques.

In addition, in the illustrated embodiment, multiple excess capacity users 150 are interacting with the PESSM 110 to configure and/or request execution of one or more programs using excess program execution capacity of the PES—such excess capacity users may include users who use private excess capacity pools and/or one or more general excess capacity pools. As previously noted, excess program execution capacity may include excess and/or unused program execution capacity that may be otherwise allocated for other uses, and in some embodiments may be separated into at least one general excess capacity pool that includes the excess computing capacity that is not in use as part of one or more other private excess capacity pools. For example, in the illustrated embodiment, excess program execution capacity may include a number of the computing nodes 120 that are otherwise allocated for other purposes (e.g., for use by dedicated capacity users 140, variable capacity users 130, and/or other users 160), but are not currently being used for those purposes. The excess capacity users may configure requests for execution of programs in various ways in various embodiments, such as by specifying a number and/or type of computing nodes for execution of programs, a minimum and/or maximum number of computing nodes to use, an expiration time for the request, a preferred execution time and/or period of execution, one or more bids for payment of use of excess program execution capacity (e.g., a bid per each use of a computing node, a bid per use of one or more computing nodes per some unit of time, a minimum and/or maximum bid, etc), etc.

Figure 2B:
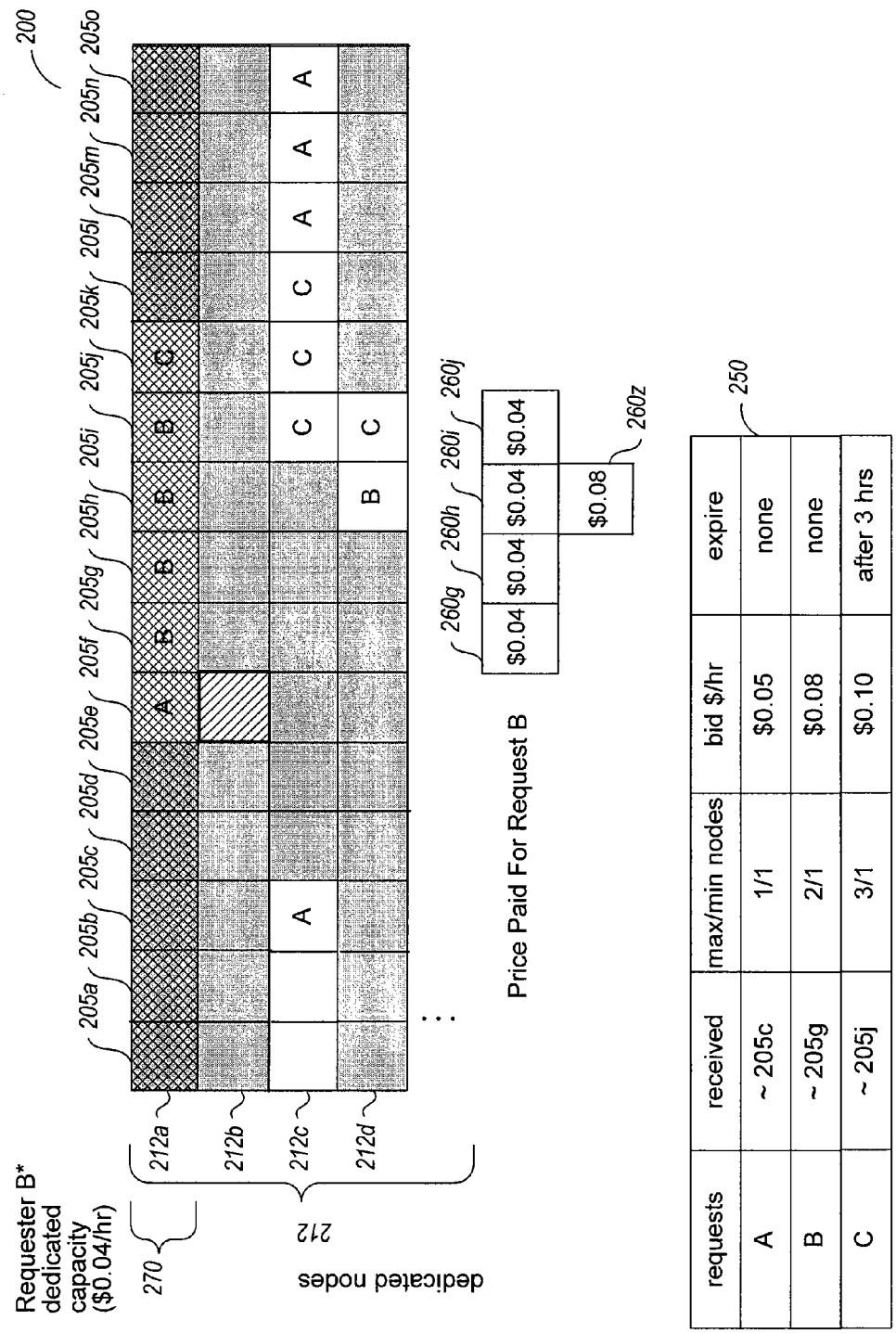

As is further discussed with respect to FIGS. 2A and 2B, the illustrated embodiment of the PESSM 110 may determine when to include and/or remove one or more computing nodes 120 from excess program execution capacity that is available for use by excess capacity users 150, when to initiate and/or terminate requested execution of programs for excess capacity users 150, and on which of the computing nodes 120 available for use by excess capacity users to execute the programs. In addition, the PESSM 110 may further track how much excess capacity is available for each of one or more excess capacity users 150 in private excess capacity pools for those users, such as for some or all excess capacity users 150 that are also dedicated capacity users 140. In various embodiments, the PESSM 110 may determine that one or more computing nodes are unused and/or or otherwise available for use by excess capacity users 150 in various ways. For example, in some embodiments, the PESSM 110 may receive indications from various users and/or entities that one or more computing nodes are not being used or are otherwise available for use by excess capacity users, such as indications from one or more dedicated capacity 140 users that they are not using some number and/or portion of the computing nodes dedicated for use by those users. In some such embodiments, such dedicated capacity users may indicate one or more times at which dedicated computing nodes are likely to be or are committed by the dedicated capacity users to be unused and/or available (e.g., particular times of day, particular days, periods of time, etc.). In addition, in some embodiments, one or more other users 160 may interact in similar manners to indicate that one or more computing nodes, such as one or more computing nodes under the control of the one or more other users 160 (e.g., third party computing systems, not shown), are available for use by excess capacity users.

In other embodiments, the PESSM 110 may automatically determine when computing nodes are available for excess capacity users, such as, for example, by monitoring some or all computing nodes 120 to determine when the computing nodes are not being used and/or by tracking usage patterns of one or more users of such computing nodes (e.g., dedicated capacity users 140, variable capacity users 130, other users 160, etc.). In some such cases, determining whether computing nodes are unused or otherwise underutilized may include determining and/or predicting a likelihood that the computing nodes will remain unused for at least a period of time sufficient to execute programs of one or more excess capacity users, such as, for example, based on an analysis of past use patterns of the computing nodes by one or more users. In various embodiments, a period of time sufficient to execute programs of one or more excess capacity users may be based on one or more considerations, such as a time to stop/start programs on behalf of users, a time to configure computing nodes for use, a type of program executed on behalf of an excess capacity user (e.g., some types of programs may perform useful amounts of work in short periods of time, such as various types of data processing, etc., while other programs use longer periods of time before useful results are produced), etc.

After it is determined that one or more computing nodes 120 are available for use by one or more excess capacity users 150, such computing nodes may be added to a general pool of available excess program execution capacity and/or otherwise tracked as being part of one or more private excess capacity pools, such that the one or more computing nodes may be used by the PESSM 110 for executing programs on behalf of corresponding excess capacity users 150 until such time that other uses of the computing nodes arise (e.g., such as priority usage by dedicated capacity users 140, variable computing users 130, and/or one or more other users or entities 160). The PESSM 110 may further determine that one or more of the excess capacity computing nodes are no longer available for use by excess capacity users 150 in various ways in various embodiments. For example, in some embodiments, the PESSM 110 may receive indications that one or more computing nodes are no longer available, such as based on explicit requests to stop use of the computing nodes from a user 160 that controls those computing nodes, requests to execute programs of priority users on the one or more computing nodes, an expiration of a specified period of availability, etc. As another example, in some embodiments, the PESSM 110 may automatically determine other uses for the computing nodes, such as, for example, based on received requests from one or more users that correspond to the other uses, or based on determining a likely demand for one or more computing nodes 120 (e.g., based on detecting an increased usage of other resources and/or programs for which the computing nodes may be used, etc.).

In some embodiments, an excess capacity user 150 may interact with the PESSM 110 to request immediate execution of one or more programs on a specified number of excess computing nodes and/or to schedule such execution at one or more future times, such that the PESSM 110 may initiate the requested execution on the specified number of excess computing nodes if it is determined that the specified number of excess computing nodes are available at the time of the requested execution. The determination of whether the specified number of excess computing nodes are available at the time may include first considering whether a private excess capacity pool (if any) for the user includes the specified number of excess computing nodes, and selecting those excess computing nodes for use if they are available. If only a subset of the specified number of excess computing nodes are available in a private excess capacity pool for the user, the PESSM 110 may in some embodiments select those private excess computing nodes to use in partially fulfilling the request, and attempt to obtain the remaining excess computing nodes from the general excess capacity pool, or instead may proceed in other manners (e.g., fulfilling the request using only the subset of available private excess computing nodes; indicating that the request fails because the private excess capacity pool does not include all of the specified number of excess computing nodes; attempting to fulfill the request using only excess computing nodes from the general excess capacity pool; etc.). In addition, in some embodiments, an excess capacity user 150 may interact with the PESSM 110 to configure a request for execution of one or more programs on a specified number of excess computing nodes to be performed as such excess computing nodes become available to execute the one or more programs, such as during an indicated future period of time, and in some such embodiments the PESSM 110 may initiate the requested execution on the specified number of excess computing nodes when it determines that the specified number of excess computing nodes are available during that period of time. In some embodiments, an excess capacity user 150 may specify a minimum and/or maximum number of excess computing nodes to use for performing a requested execution, such that the requested execution is initiated if the PESSM 110 determines that at least the minimum number of excess computing nodes are available (whether from a private excess capacity pool and/or a general excess capacity pool), and the PESSM 110 may initiate the requested execution on up to the maximum (if specified) number of excess computing nodes for the request based on availability of the excess computing nodes.

After a request for execution of one or more programs on behalf of an excess capacity user 150 is received, if the PESSM 110 determines that there are an appropriate number of computing nodes with sufficient computing resources to satisfy the requested execution (whether from a private excess capacity pool and/or a general excess capacity pool), the PESSM may select which of the available computing nodes to use for the requested execution in various ways. For example, in some embodiments, the PESSM may simply select an appropriate number of excess computing nodes from any of the available computing nodes with sufficient resources, such as, for example, by randomly selecting from a pool of available computing nodes. In other embodiments, one or more specific computing nodes may be selected on the basis of one or more other factors, such as, for example, a predicted length of and/or likelihood of continued availability of the one or more specific computing nodes, a physical proximity of the one or more specific computing nodes to one or more other computing nodes, a geographic location of the one or more specific computing nodes and/or one or more other computing nodes, etc. Furthermore, if one or more particular computing nodes have been dedicated for use by a particular user, those particular computing nodes may be the only ones used as part of a private excess capacity pool for that particular user.

As previously noted, execution of programs for excess capacity users on excess computing nodes may be temporary, such that the PESSM 110 may automatically terminate such programs when other preferred uses for the excess computing nodes arise (e.g., such as if the excess computing nodes are reclaimed by a dedicated capacity user 140 who previously was not using a decided computing node, etc.). In such cases, if programs are currently executing on behalf of excess capacity users 150 on any of those excess computing nodes, then those programs may be automatically terminated (e.g., aborted, shut down, hibernated, etc.), such that the computing nodes are free for other purposes and no longer available for excess capacity users. In addition, as discussed in greater detail elsewhere, in some embodiments the execution state of those programs may be saved before they are terminated, such as to enable a later restart of the program. Furthermore, in some such embodiments, there may be multiple excess computing nodes currently executing programs on behalf of excess capacity users 150 that may be capable of satisfying the number of computing nodes for the other purposes, and in such cases, the PESSM 110 may determine which of the excess computing nodes to free for the other purposes based on various factors (e.g., by first reclaiming excess capacity computing nodes from a private excess capacity pool of a user for use in fulfilling a request from that user for dedicated capacity use; or by using a determined priority among the current requests of the excess capacity users, such as based on time submitted, bid prices, etc.). In some embodiments, at least some of the terminated programs may have their execution be migrated and/or reinitiated on one or more other available excess computing nodes (if any), such as immediately or at a later time. In some such cases, if there are not enough excess computing nodes available to satisfy all of the current excess capacity users 150 who are executing programs (or requesting execution of programs), then the PESSM 110 may determine to terminate one or more additional programs executing on one or more other excess computing nodes such that the one or more programs initially terminated that were executing on the specific computing nodes may be reinitiated on the newly freed excess computing nodes (e.g., based on a determined priority of the excess capacity users, such that the requests associated with the one or more initially terminated programs that were executing on the specific computing nodes have higher priority than at least some of the requests associated with the one or more additional programs). In some embodiments, after the PESSM 110 automatically terminates a program of a user, the PESSM 110 may automatically reinitiate the execution of the programs as excess computing nodes become available to execute the programs for the user. In addition, in other embodiments, at least some terminated programs of a user may be automatically migrated and/or reinitiated on one or more other computing systems and/or program execution services with sufficient computing resources available to execute the programs, including one or more computing nodes available via variable capacity functionality provided to variable capacity users 130, dedicated capacity functionality provided to dedicated capacity users 140, and/or one or more third-party computing systems (not shown) external to the PES.

In addition, various types of programs may be better suited for executing in such a temporary execution environment as provided by excess capacity pools, such as programs that are relatively tolerant of unexpected interruptions due to occasional termination. In some embodiments, excess capacity users may execute one or more programs on the excess program execution capacity that are designed to intermittently track and/or save progress (e.g., intermediate results, current runtime state, etc.), so that the programs may be reinitiated at a future time to resume activities. In addition, in some embodiments, when the PESSM 110 automatically terminates programs executing on excess computing nodes, the PESSM 110 may automatically detect the current system and/or program execution state, such that the detected state may be saved and/or provided to a respective excess capacity user 150, so that later execution of the programs may be resumed in a state similar to when the programs were automatically terminated. Alternatively, if a particular executing program is able to save its own execution state, the PESSM 110 may instead notify the program to perform its own execution state save before terminating the program. Additional details related to example embodiments of saving program execution state are included in U.S. patent application Ser. No. 12/334,004, filed Dec. 12, 2008 and entitled "Saving Program Execution State," which is hereby incorporated by reference in its entirety.

As previously noted, in at least some embodiments, a user having a private excess capacity pool receives priority access to any program execution capacity in that private excess capacity pool (e.g., so as to execute any excess capacity requests from the user before any excess capacity requests from any others), but if such a private excess capacity pool includes excess capacity that is not currently in use by the associated user for the private pool, that currently available excess capacity may be made temporarily available via a general excess capacity pool to other users. In addition, access to excess computing nodes from a general excess capacity pool for executing programs on behalf of multiple excess capacity users 150 may be based on priority among the excess capacity users 150 in at least some embodiments, such that if there is contention for some amount of the excess computing nodes between two or more requests to execute programs, the request having a higher associated priority will be provided access to use the contended amount of excess computing nodes for executing programs. In at least one illustrative embodiment, requests with the highest bid amounts (e.g., a highest maximum bid) may be given priority over requests with lower bids, with ties between bid amounts being resolved based on other factors (e.g., which request was received earlier). In some embodiments, one or more of the excess capacity users 150 may interact with an embodiment of the PESSM 110 to bid (e.g., auction-style) on access to one or more available excess computing nodes (e.g., currently available and/or available at one or more future times) of the general excess capacity pool, such that the user with the winning bid may receive the access to the one or more available excess computing nodes. In some embodiments, the PESSM 110 may automatically terminate execution of programs associated with lower priority requests that are currently executing on one or more of the excess computing nodes in favor of executing programs of higher priority requests on the one or more excess computing nodes. In some other embodiments, such as non-priority based embodiments, the PESSM 110 may instead occasionally rotate through pending requests to execute programs on excess computing nodes, such that each request may be provided some amount of execution time on one or more of the excess computing nodes.

In some embodiments, the PESSM 110 may provide interactive feedback to one or more of the excess capacity users 150 that are interacting with the PESSM 110 to configure and/or request execution of programs on some amount of excess computing nodes of a general excess capacity pool. For example, in some such embodiments, interactive feedback may include indications of when and/or for how long requested programs may be likely to execute on the indicated amount of excess computing nodes, such as based on current and/or predicted demand, current and/or likely amounts of excess computing nodes, one or more bid-levels, etc. In one illustrative embodiment, the PESSM 110 may indicate suggested bid levels along with corresponding information indicating when requested execution will likely occur and/or complete, such that the excess capacity user 150 may reconfigure (e.g., by specifying a different bid, a different amount and/or type of computing nodes, a different duration of execution, etc.) a request to meet the desires of the excess capacity user, such that the request may be performed at an earlier time, etc.

As previously noted, excess capacity users 150 may be charged various fees in conjunction with use of excess program execution capacity, such as based on whether the excess program execution capacity being used for a user is part of a private excess capacity pool for that user, based on a quantity of computing nodes used and/or one or more use factors (e.g., number of times used, amount of shared resources consumed, amount of time computing nodes are used, etc.), and/or based on one or more bids from the one or more excess capacity users 150 for use of the computing nodes. In some embodiments, a portion of the fees charged to the one or more excess capacity users 150 who use a general excess computing capacity pool may be supplied to one or more other users who provided computing nodes in that general excess capacity pool (e.g., one or more dedicated capacity users 140, one or more other users 160, etc.). For example, in some embodiments, such other users may be paid a proportional share of some amount of the fees that are collected from excess capacity users, such as a proportional share reflective of the amount of computing nodes contributed by the other users over time. In some cases, such fees supplied to the other users may be automatically credited and/or paid to the other users by the PES provider, such as to offset other charges incurred by those other users, such as charges incurred by dedicated capacity users.

In addition, in some embodiments, the PESSM 110 may provide an electronic marketplace (not shown) to one or more dedicated capacity users 140, such that the one or more dedicated capacity users 140 may transfer access to their dedicated computing nodes to one or more other users 160 during the use time period of the dedicated capacity, while in other embodiments a dedicated capacity user 140 and an other user 160 may arrange an exchange in a manner external to the PES. In some embodiments, a user 160 may provide payment to a dedicated capacity user in exchange for access to a transferred portion of the dedicated capacity user's dedicated computing nodes, such that the purchasing user may access the transferred portions of dedicated program execution capacity to execute programs on behalf of the purchasing user. A price for the exchanged access may be determined in various manners in various embodiments, such as via a fixed price specified by the dedicated capacity user, a price that is bid or suggested by the user 160, etc. In some embodiments, an exchange for dedicated computing nodes may be made such that the exchange is temporary and/or permanent. For example, in some embodiments, an exchange may be made for a specified limited period of time and/or various intervals of time, such that the purchasing user may access the computing nodes during that specified time and/or during the various intervals, after which the dedicated computing nodes may revert back to the dedicated capacity user for use by the dedicated capacity user. In other embodiments, the exchange may be permanent, such that the purchasing user may be provided with access to the dedicated computing nodes for any remaining use period associated with the dedicated computing nodes. In some embodiments, as part of the initial allocation of one or more computing nodes for dedicated use by a subscribing dedicated capacity user 140, the PESSM 110 may assign one or more user tokens to the subscribing user and/or may otherwise associate the allocated computing nodes with the subscribing dedicated capacity user's account, such that the dedicated capacity user's use of the computing nodes may be tracked for various purposes (e.g., configuration, authorization, billing, etc.)—in such embodiments, when a dedicated capacity user transfers a portion of their dedicated computing nodes to a new user, any provided tokens may be transferred to the new user and/or the portion of computing nodes may be otherwise associated with an account of the new user. In some embodiments, a provider of the PESSM 110 may further collect a fee in conjunction with a transfer of a portion of dedicated computing nodes from one user to another.

Although the foregoing example embodiment of FIG. 1A is described with respect to a PES that provides various types of functionality for various types of users, such as variable capacity users, dedicated capacity users and excess capacity users, it will be appreciated that various other embodiments may exist, such as embodiments with or without one or more of the various types of users. For example, it will be appreciated that some embodiments may exist where a program execution service provides functionality for excess capacity users, but does not include variable and/or dedicated capacity users, such as where the excess program execution capacity is provided by one or more third-parties and/or affiliate entities associated with the PES, such as to allow such parties and/or entities to monetize otherwise unused computing resources. In addition, some of the techniques may be used in conjunction with a bid-based PES that allows users to submit requests for and/or to schedule execution of programs on a temporary basis on all of the program execution capacity provided by the service, such that requests with higher priority at the time of execution are executed. In addition, it will be appreciated that the various users 130, 140, 150 and 160 may each act as one or more of the other various users at times, such as when those users are accessing associated functionality of the types corresponding to those other various users, including for dedicated capacity users 140 to at times act as excess capacity users 150 and use private excess capacity pools based on those users' unused dedicated capacity. As another example, in some embodiments, a particular user who acts as a dedicated capacity user to execute programs on dedicated program execution capacity may also act as an on-demand variable capacity user, such as when the particular user desires additional computing resources to execute one or more programs for the respective user, etc.

In addition, in at least some additional embodiments, unused portions of a single one of the computing nodes 120 (e.g., unused processing unit clock cycles, unused portions of memory, etc.) may be made available for use by one or more excess capacity users 150, such that one or more programs of the one or more excess capacity users may be sharing resources of a single computing node with a dedicated capacity user 140 and/or other excess capacity users 150. In addition, in some embodiments, at least some of the computing nodes that are allocated for use by dedicated capacity users 140 may be made available for use by one or more variable capacity users 130, such as if it is determined that such access is unlikely to impact dedicated capacity users (e.g., in cases where accurate predictions of upcoming demand can be forecast, etc.). Furthermore, in some embodiments, if some amount of computing nodes dedicated for use by one or more dedicated capacity users 140 is oversubscribed (e.g., oversold, and/or provided to one or more other long term users), such that the oversubscribed computing nodes are unavailable for the one or more dedicated capacity users 140 at a time that those users request use of them, then one or more of the programs executing on the oversubscribed computing nodes may be migrated to one or more other computing nodes, such as one or more other computing nodes available in one or more remote data centers and/or other computing systems available for executing the one or more programs, such as computing systems provided by another program execution service, etc.

In addition, although some embodiments are described with respect to a program execution service and program execution capacity, it will be appreciated that the described techniques may be used to manage access to various other groups of computing nodes or other types of computing-related resources. A non-exclusive list of examples of other types of computing-related resources that may be managed for use by multiple users may include the following: persistent data storage capabilities (e.g., on non-volatile memory devices, such as hard disk drives); temporary data storage capabilities (e.g., on volatile memory, such as RAM); message queuing and/or passing capabilities; other types of communication capabilities (e.g., network sockets, virtual communication circuits, etc.); database management capabilities; dedicated bandwidth or other network-related resources; input device capabilities; output device capabilities; processor (e.g., CPU) cycles or other instruction execution capabilities; etc. For example, a user may request one or more indicated types of computing-related resources to use, and the PESSM module may automatically determine an amount of each indicated type of resource (e.g., based on an explicit quantity or other amount indicated by the user in the request, based on predetermined amounts associated with particular resource types, based on available amounts of the indicated resource types, etc.) to provide for the user, such as a first amount of volatile memory and a second amount of persistent storage.

FIG. 1B illustrates an embodiment in which a program execution service may be provided using one or more data centers that include multiple physical computing systems. In particular, FIG. 1B illustrates an example embodiment in which a PESSM module 180 of a program execution service manages execution of one or more programs on behalf of users. The illustrated example includes a data center 170 used by the PES that is connected to the Internet 196 external to the data center 170. In this example, the Internet 196 provides access to various external computing systems, such as computing systems 190 via private network 194 and other computing systems 192, as well as additional computing systems (not shown) at one or more other data centers 198. The private network 194 may be, for example, a corporate network that is wholly or partially inaccessible from non-privileged computing systems external to the private network 194. Computing systems 192 may include, for example, a home computing system that connects directly to the Internet (e.g., via a telephone or cable modem, a Digital Subscriber Line ("DSL"), etc.). In addition, the one or more other data centers 198 may further be used by the PES in at least some embodiments.

The example data center 170 includes a number of physical host computing systems 175, physical computing systems 182, and the PESSM module 180 of the PES. In this example, host computing systems 175 each provides multiple virtual machines 177 and has a virtual machine ("VM") manager component 179 to manage those virtual machines (e.g., a hypervisor or other virtual machine monitor), and some or all of the computing systems 182 may similarly have one or more such virtual machines and/or VM Manager components (not shown). Alternatively, in other embodiments, some or all of the physical host computing systems at the data center may not provide any virtual machines, such as to instead directly execute one or more programs on behalf of end user customers of the PES. Furthermore, in some embodiments various of the computing systems 175 and 182 may have differing capabilities, may have different associated fees for use, may support different types of user programs (e.g., virtual machine software image instances of different sizes, or programs with different types of resource criteria and/or computing resource usage, such as differing patterns of I/O and memory access and network usage), etc. If so, particular users and/or their programs may be grouped (e.g., automatically) according to one or more such factors, which may further be used as constraints and/or preferences regarding which computing systems to select for executing particular programs. The example data center 170 further includes an internal network 172 that may include multiple networking devices (not shown), such as switches, edge routers, and core routers, with computing systems 175 and 182 and one or more computing systems (not shown) that execute the PESSM module 180 being connected to the internal network 172.

The illustrated PESSM module 180 performs at least some of the described techniques in order to manage execution of programs using the computing systems 175 and 182, as described in greater detail elsewhere. When a particular computing node or system is selected to execute one or more programs of a user, the PESSM module may in some embodiments initiate execution of those programs by interacting with a VM manager component or other manager component that controls execution of programs for that selected computing node/system, or may alternatively directly execute the programs on the selected computing node/system. Users of the PES may use various computing systems to interact with the PESSM module 180, such as computing systems 190 or 192, or computing systems at one of the other data centers 198.

It will be appreciated that the data center of FIG. 1B is provided for illustrative purposes only, and that program execution services and other software execution services may be provided in other manners in other embodiments. For example, PESSM module 180 may instead be provided using one or more other computing systems external to the data center 170, such as computing systems 190, 192 or at a data center 198. In other embodiments, a PES may be provided without using any data centers.

FIGS. 2A and 2B illustrate examples of techniques for managing use of excess computing nodes, such as that may be automatically performed by an embodiment of a PESSM module. In particular, FIG. 2A illustrates an example of receiving and handling requests to use excess computing capacity from a general excess computing capacity pool, with none of the example users in FIG. 2A having an associated private excess computing capacity pool. FIG. 2B continues the example of FIG. 2A, but with one of the users having a private excess computing capacity pool, and with the handling of the various requests including use of that private excess computing capacity pool.

With respect to FIG. 2A, table 200 illustrates information about usage of a number of computing nodes 210 of a program execution service by various users of the program execution service over time 205, with use of each computing node 210 being illustrated at consecutive time intervals 205a-205o. In addition, table 250 illustrates information about example requests A, B, C and D received by the program execution service to execute programs on behalf of users using excess computing nodes of a general excess computing capacity pool of the program execution service. In the illustrated table 200, shading is used as follows: a time interval having a solid gray background (e.g., time interval 205a of dedicated computing node 212b and time interval 205h of other computing node 214a) indicates that the respective computing node is not available to be used for excess program execution capacity during that respective interval of time (e.g., it is being used for one or more other purposes and/or is otherwise not available); a time interval having a solid white background (e.g., time intervals 205b and 205c of dedicated computing node 212c) or having a diagonal-lined background (e.g., time interval 205f of dedicated computing node 212b and time interval 205o of other computing node 214b) indicates that the respective computing node is available for use as excess program execution capacity during that respective interval of time; and a time interval containing a letter A, B, C or D (e.g., time intervals 205f-205k of dedicated computing node 212a) indicates that programs of the respective request for excess program execution capacity are executing on the respective computing node during that time interval. As one illustrative example, each time interval 205a-205o may correspond to an hour, or instead to other time intervals (e.g., a day, 10 minutes, etc.).

As previously noted, table 250 illustrates various requests received by the program execution service at various indicated times, such that each of the various requests is to execute one or more programs on a specified amount of excess computing nodes available from the program execution service using computing nodes 210. In addition, each of the requests has various specified configuration information in this example, including a specified minimum and maximum number of computing nodes on which to execute the one or more programs of the request; a bid fee amount that the user is willing to pay for execution of the one or more programs on each of the computing nodes (e.g., such as a dollar amount per use hour of a single computing node); and an indication of a time at which the request is to expire (e.g., such as a specified total duration of execution time after which a request is to expire, a specified time at which a request is to expire, etc.). As one illustrative example, request A was received at a time that approximately corresponds to time interval 205c (e.g., just before time interval 205c or during time interval 205c), with a minimum and maximum number of computing nodes both indicating a preference to execute on a single excess capacity computing node, with a bid price of $0.05 per hour of use of the single excess computing node, and with no specified expiration (e.g., indicating that the request is to continuously execute and/or re-execute until the program execution is completed). In this example, all of the computing nodes 210 may provide approximately or exactly the same amount of computing capacity per time interval, while in other embodiments a standard amount of program execution capacity may be indicated in other manners (e.g., with a logical 'computing node' measure that corresponds to a particular amount of computing resources, and with particular actual computing nodes being rated as to the number of logical 'computing nodes' that they provide. In other embodiments, the various requests may be configured in other ways, such as to include one or more of a specified particular type of computing node to use (e.g., and/or characteristics of such computing nodes), a minimum and/or maximum bid amount, and/or one or more other configurations (e.g., fault tolerance requirements, execution locality and/or proximity preferences, etc.). In addition, other types of information may be indicated in some embodiments, such as one or more particular programs to be executed for each request, a total amount of aggregate computing node time intervals for the request, etc.

The illustrated table 200 includes a number of dedicated capacity computing nodes 212, such as computing nodes that have been allocated for dedicated access to one or more specific dedicated capacity users of the program execution service, and also includes a number of other computing nodes 214, such as computing nodes that may be available for other types of program execution capacity (e.g., on-demand variable program execution capacity). For example, a dedicated capacity user (not shown) may have priority access to the specific computing node 212a for a specified period of time (e.g., a year), such that the user may access computing node 212a to execute programs on behalf of the user at any time during the specified period of time, although such access may be subject to a delay period and/or one or more interactions on the part of the user to gain access (e.g., notifications of an intent to use the computing node 212a at a particular time, a request to execute programs on computing node 212a, etc.). In other embodiments, the dedicated capacity user (not shown) may instead have priority access to a computing node with equivalent computing resources as computing node 212a (e.g., equivalent processing capacity, memory, etc.), but not have a particular allocated computing node 212, such that the user may be provided access to any of the computing nodes 212 that are equivalent to 212a for executing programs on behalf of the user and that are available for use. In various such embodiments, the program execution service may ensure that a sufficient number of dedicated computing nodes equivalent to 212a are available for use by dedicated users who may have priority access to such computing nodes in various ways (e.g., maintaining a group of such computing nodes and/or otherwise reserving a specific amount of such nodes, etc.).

In table 200, during interval 205a-c, dedicated computing node 212c has been determined to be excess capacity, such as based on being unused by a dedicated capacity user to whom computing node 212c is allocated, and has thus been made available for use by excess capacity users. For example, the dedicated capacity user may have interacted with the program execution service to indicate that computing node 212c is available for excess program execution capacity, such as at some time prior to time interval 205a, or the program execution service may have instead automatically determined that the computing node 212c was unused. In the illustrated example, all other of the illustrated computing nodes (e.g., 212a-b, 212d, and 214a-b) have not been determined to be available during the interval 205a-205c. During time interval 205c, request A is received, and the program execution service determines to execute a program associated with request A on the available excess capacity computing node 212c, for the user-specified fee of $0.05/hour, and initiates execution of the program on computing node 212c. In other embodiments, the program execution service may instead have a fixed price fee that some or all excess capacity users use.

At time interval 205d, the program execution service determines that computing node 212c is no longer available to satisfy excess program execution capacity requests (e.g., based on an indication received from a dedicated capacity user reclaiming use of the computing node), and so the execution of the program associated with request A is terminated on computing node 212b. At interval 205f, the program execution service determines that two computing nodes with sufficient resources to execute request A (e.g., dedicated computing nodes 212a and 212b) are available as excess capacity computing nodes, and determines to reinitiate execution of request A's program on dedicated computing node 212a. In the illustrated embodiment, the diagonal lines at time interval 205f with respect to dedicated computing node 212b indicate that node 212b is available during that time interval for use as excess computing capacity, but is not preferred for excess computing capacity use, and thus is not selected to satisfy request A. Computing node 212b is not preferred for various reasons, such as it having a short and/or uncertain duration of availability (e.g., as determined by the program execution service, such as based on indications from the dedicated capacity user to whom it is allocated, based on prior history of use, based on forecasted use, etc.), whereas node 212a may be determined to have an availability that is likely to be relatively longer than node 212b. In such a situation, the program execution service may have a preference for selecting a computing node with a longer likely availability for executing a request of an excess capacity user, such as to minimize having to start/stop execution programs on the various computing nodes 210, etc. Thus, in this example, computing node 212b is not used during time interval 205f, but if another excess computing capacity request had been received prior to time interval 205f, node 212b may have nonetheless been used for that other request.

In this example, request B is received at interval 205g, as illustrated by table 250. In this case, there is only one excess computing node available at that time (e.g., dedicated computing node 212a), and the program execution service determines to terminate the execution of the program for request A in lieu of the program of request B, such as based on request B having a higher bid amount (e.g., $0.08/hour) than request A (e.g., $0.05/hour) or otherwise having a higher priority. In this example, request B is executed continuously on dedicated computing node 212a for a fee of $0.08/hour over the time intervals 205g-205i. At time interval 205i, two computing nodes are available as excess computing nodes (dedicated computing nodes 212a and 212d), each having sufficient resources for executing the program for request B—since request B specifies a maximum of two computing nodes, the program of request B remains executing on node 212a in the illustrated embodiment, and is also initiated on node 212d.

At time interval 205j, three dedicated computing nodes are determined to be available as excess capacity computing nodes (computing nodes 212a, 212c and 212d), and request C is received. In this embodiment, the programs of request B are terminated from execution on dedicated computing nodes 212d and 212a, and one or more programs associated with request C are executed on all three of the available excess computing nodes based on request C having an indicated preference to execute on a maximum of three nodes and having a relatively higher bid amount (e.g., $0.10/hour) than requests A and B, thus providing a higher priority for request C than for requests A and B. At time interval 205k, two dedicated computing nodes are determined to be available as excess computing nodes (computing nodes 212a and 212c), such as based on computing node 212d having been reclaimed for other purposes or otherwise having become unavailable. The one or more programs associated with request C are terminated on computing node 212d but remain executing on nodes 212a and 212c, such as based on the preferred maximum and minimum number of computing nodes for request C, and request C having a higher priority than requests A and B. The program(s) of request C continue to execute on computing node 212c at time interval 205l, but the execution on computing node 212a is terminated due to the computing node becoming unavailable for excess computing capacity use. After time interval 205l, the program execution service determines that request C has executed for at least three hours over the time intervals 205j-205l, and has thus expired. Accordingly, the program execution service terminates execution of the programs associated with request C on the excess capacity computing nodes, and request C is no longer treated as a pending request to be satisfied. At time interval 205m, one computing node (dedicated computing node 212c) is determined to continue to be available for use as excess program execution capacity, and the execution of the program associated with request B is reinitiated on the computing node.

During time interval 205m, the execution of the program(s) for request B ends (e.g., based on the program(s) completing their execution after 5 aggregate hours of execution, or instead based on an instruction received (not shown) to cancel request B from the excess capacity user who submitted request B), and request B is treated as no longer being a pending request to be satisfied. In addition, at or near this time, request D is received, having a bid amount equivalent to previously received request A (e.g., $0.05/hour). In this case, the program execution service determines to reinitiate execution of the program associated with request A on available dedicated computing node 212c at next time interval 205n rather than the program associated with request D, based on request A having been received at an earlier time than D. Request A continues to execute on node 212c until some unknown future time after time interval 205o. At interval 205o, one of the other computing nodes 214b becomes available for use as excess program execution capacity, and is determined to be a non-preferred excess capacity computing node, but the program of request D is nonetheless executed on the other computing node 214b since no other excess computing nodes are currently available.

In the illustrative example of FIG. 2A, the program execution service may further track usage of the computing nodes 210 corresponding to the various requests A-D, such that the various associated users are charged fees corresponding to the bid amounts indicated by the various requests. In addition, the program execution service may also track which of the computing nodes 210 were used and/or were made available for use by excess capacity users, such that one or more users associated with those computing nodes may be given some portion of the fees collected from the excess capacity users.

FIG. 2B continues the example of FIG. 2A, but with one of the users having a private excess computing capacity pool, and with the handling of the various requests including use of that private excess computing capacity pool. FIG. 2B illustrates information 200 and 250 in a manner similar to that of FIG. 2A, but with some changes to reflect the use of the private excess computing capacity pool, as discussed below. In addition, new information 260 and 270 has been added to FIG. 2B relative to FIG. 2A.

In particular, in the example of FIG. 2B, the user who submits request B (referred to as Requester B* in FIG. 2B) is also a dedicated capacity user, and has been allocated the dedicated use of computing node 212a for a time period that includes time intervals 205a-205o, as shown by information 270. Accordingly, in FIG. 2B, the shading for computing node 212a has been changed to include crosshatching to reflect that any unused capacity of computing node 212a is available for use as a private excess capacity pool for Requester B*. In this example, the time intervals of 205a-205e and 205l-205o for computing node 212a correspond to dedicated use of computing node 212a by Requester B*, and thus computing node 212a is available during the time intervals of 205f-205k for use as part of the private excess computing capacity pool for Requester B*. As discussed in greater detail elsewhere, requests from Requester B* have priority for use of the private excess computing capacity pool.

The assignments for time intervals 205a-205i are the same in FIG. 2B as in FIG. 2A. For example, request B from Requester B* was already assigned to use computing node 212a for time intervals 205g-205i in FIG. 2A, based on request B having a higher priority for the general excess computing capacity pool in FIG. 2A than request A, and thus the use of computing node 212a for the private excess computing capacity pool in FIG. 2B does not alter those prior assignments. However, after request C is received for time interval 205j, the assignments change in FIG. 2B relative to FIG. 2A based on the use of the private excess computing capacity pool. In particular, in FIG. 2A, request C was given higher priority than requests A and B for the general excess computing capacity pool, and thus all three excess computing capacity nodes available at time interval 205j in FIG. 2A began to execute the program(s) for request C. With respect to FIG. 2B, however, request B from Requester B* continues to have the highest priority at time interval 205j for the excess computing capacity in Requester B*'s private excess computing capacity pool—accordingly, the program(s) for request C similarly begin to execute on computing nodes 212c and 212d at time interval 205j in FIG. 2B, but the program(s) for request B continue to execute on computing node 212a at that time interval in FIG. 2B in a manner different from that of FIG. 2A. In particular, since a request from Requester B* is available at time interval 205j, that request (in this example, request B) is given priority to use the excess computing capacity of computing node 212a that is part of Requester B*'s private excess computing capacity pool. Similarly, at the subsequent time interval 205k, if the program(s) for request B had continued to execute, those program(s) would have continued to execute on computing node 212a for the same reasons, based on the higher priority of request B than request C for the private excess computing capacity pool of Requester B*. However, in this example, since request B ends after 5 aggregate hours of program execution, the program(s) of request B end after time interval 205j. Accordingly, the excess computing capacity for computing node 212a at time interval 205k returns to the general excess computing capacity pool, and the program(s) of request C begin to execute on computing node 212a for time interval 205k.

Thus, the use of the private excess computing capacity pool provides various benefits for Requester B* in the example of FIG. 2B. For example, as a first benefit, request B is completed more rapidly in the example of FIG. 2B, in particular by the end of time interval 205j in FIG. 2B rather than the end of time interval 205m in FIG. 2A. In addition, as a second benefit in the example of FIG. 2B, the performance of request B is performed more cheaply for Requester B* than the performance of request B in FIG. 2A. In particular, in the example of FIG. 2B, the use of the private excess computing capacity pool by Requester B* is charged to Requester B* at the same rate as the incremental on-going cost of using dedicated computing node 212a, which in this example is $0.04 per time interval hour, as shown in information 270. Thus, while the performance of request B in FIG. 2A would have cost the request B bid price of $0.08 per time interval hour (i.e., twice that amount for each time interval hour as the incremental on-going cost of using dedicated computing node 212a) for each of the 5 aggregate hours of execution of the program(s) for request B, in FIG. 2B the cost for performing request B is only $0.04 per time interval hour for the four of the five aggregate hours in which the private excess computing capacity pool was used, as shown in cost information 260g-260j. For the other time interval hour during which request B is executed on computing node 212d in FIG. 2B as part of the general excess computing capacity pool, the cost is charged at the request B bid price of $0.08 per time interval hour, as shown in cost information 260z. Thus, the total cost for performing request B in FIG. 2B is $0.24, while the total cost for performing request B in FIG. 2A is $0.40. While the absolute numbers are small in this example based on the limited amount of use of excess computing capacity, it will be appreciated that increasing such excess computing capacity by a significant amount in a real-world situation may result in correspondingly larger actual cost savings (e.g., if use is increased a thousand-fold, the corresponding savings would be ~$1600 in this example, based on actual costs of $2400 rather than $4000).

Furthermore, in other situations, request B may be performed even more cheaply than in the example of FIG. 2B. For example, in FIG. 2B, one of the five aggregate hours of execution of the program(s) of request B (i.e., 20% of the total aggregate hours of execution) was performed using the general excess computing capacity pool (i.e., use of the time interval of 205$i$ for computing node 212$d$), and an available other hour from the private excess computing capacity pool (i.e., time interval 205$k$ for computing node 212$a$) was not used. Thus, in other situations, the execution of the program(s) for request B may instead use the private excess computing capacity pool for all of the execution of the program(s) for request B, and thus be charged at the lower cost of the private excess computing capacity pool for all of that execution. Such use of the private excess computing capacity pool may be triggered by, for example, request B having instead specified a maximum of one computing node (so that only the private excess computing capacity pool is used if it is available). Alternatively, in other embodiments, Requester B* may specify that request B (or one or more other requests) is only to be executed using his/her private excess computing capacity pool, rather than to also use the general excess computing capacity pool as a supplement to the private excess computing capacity pool.

In addition, in some embodiments, the private excess computing capacity pool may further be used in other manners to provide other benefits. For example, consider a situation similar to that of FIG. 2B, but in which request B has a higher priority than request C for use of the general excess computing capacity pool (e.g., if request C has a bid price of $0.07 rather than $0.10), in which request B uses six aggregate hours to complete execution of its program(s) rather than five aggregate hours, and in which request B specifies to use a maximum of one computing node rather than two. In such a situation, and using the allocation scheme previously described for FIG. 2B, request B would not be selected to use computing node 212$d$ in time interval 205$i$ from the general excess computing capacity (given the maximum of one computing node and the preference for using the private excess computing capacity pool), but would be selected to continue to use computing node 212$a$ in time interval 205$k$ from the private excess computing capacity pool. However, in that situation, at the end of time interval 205$i$, request B would still have 1 additional hour of execution until completion, but the availability of computing node 212$a$ in the private excess computing capacity pool at time interval 205$l$ would disappear based on the resumed use of dedicated capacity by Requester B* at that time interval. Thus, one option in that situation would be to terminate the execution of the program(s) for request B on computing node 212$a$ at the end of time interval 205$k$, and to immediately resume the execution of those program(s) for one additional hour on computing node 212$c$ during time interval 205$l$. However, in other embodiments, other possible actions may be taken. For example, to avoid the overhead of terminating and then restarting the execution of the program(s) for request B when only a short time remains until completion, those program(s) for request B could instead be allowed to complete their execution on computing node 212$a$ during some or all of time interval 205$l$. While Requester B*'s desire to resume dedicated capacity use in time interval 205$l$ could be deferred in this situation, an alternative that accommodates such a resumption of dedicated capacity use in time interval 205$l$ includes selecting another computing node to temporarily use for Requester B*'s dedicated capacity use during at least time interval 205$l$, such as computing node 212$c$. In this manner, Requester B* receives the desired dedicated capacity use in time interval 205$l$, and the execution of the program(s) for request B is allowed to complete more efficiently and quickly. Nonetheless, in such an example, the use of computing node 212$a$ during time interval 205$l$ for the completion of the execution of the program(s) for request B may not be treated for cost purposes in at least some such embodiments as being part of the private excess computing capacity pool, such that Requester B* may receive the dedicated capacity use price of $0.04 for the use of computing node 212$c$ during time interval 205$l$, but the execution of the program(s) for request B using computing node 212$a$ during time interval 205$l$ may be charged at the general excess computing capacity pool price of $0.08 to reflect request B's bid price. It will be appreciated that other alternatives may similarly be used in other embodiments and situations.

In addition, it will be appreciated that the preceding examples are provided for illustrative purposes, and that other embodiments may differ in various ways from the example. For example, although the computing nodes 210 are depicted as being equivalent (e.g., having equivalent computing resources), other embodiments may be provided where various of the computing nodes 210 may be of different types with varying characteristics (e.g., different amounts of processing capacity, memory, platform specification, etc.). In some such embodiments, various of the requests may include indications of one or more specific types of the computing nodes for use in executing programs associated with the requests, and those requests may only be executed on the corresponding specified type of computing node. In addition, in some embodiments, rather than excess computing capacity being based on unused dedicated computing nodes and other computing nodes as illustrated, embodiments may exist where only one group of computing nodes and/or additional groups of computing nodes may contribute to excess capacity computing nodes available for executing requests of excess capacity users. Furthermore, in some embodiments, at least some of the other computing nodes 214 may include computing nodes provided to the program execution service by one or more third parties.

As previously discussed, various types of functionality may be provided and used by a PES in various embodiments, and the functionality may be provided in various ways. For example, in some embodiments, program execution capacity available from a PES may include multiple computing nodes for executing programs on behalf of users, such as via multiple physical computing machines interconnected via one or more networks or other data exchange mediums that are capable of transmitting data between the computing machines. At least some of the computing machines may in some embodiments each include sufficient computing-related resources to execute multiple programs simultaneously (e.g., sufficient writeable memory, non-volatile storage, CPU cycles or other CPU usage measure, network bandwidth, swap space, etc.), and at least some of the computing machines in some such embodiments may each host multiple virtual machine computing nodes that each may execute one or more programs on behalf of a distinct user. Furthermore, in various embodiments, a PES may execute various types of programs on behalf of multiple users. For example, such programs executed on behalf of users may include one or more operating systems, applications (e.g., servers and/or other software applications), utilities, libraries, etc. In addition, in at least some embodiments, such programs may include executable software images, such as virtual machine images that are bootable or otherwise loadable on one or more virtual machine computing nodes, and that each may include operating system software, software for one or more application programs, and/or configuration information, etc.

In at least some embodiments, the execution of one or more programs on one or more computing nodes by a PES may be initiated in response to a current execution request for immediate execution of those programs. Alternatively, the initiation may be based on a previously received program execution request that scheduled or otherwise reserved the then-future execution of those programs for the now-current time. Program execution requests may be received in various ways, such as directly from a user (e.g., via an interactive console or other GUI provided by the program execution service), or from an executing program of a user that automatically initiates the execution of one or more other programs or other instances of itself (e.g., via an API, or application programming interface, provided by the program execution service, such as an API that uses Web services). Program execution requests may include various information to be used in the initiation of the execution of one or more programs, such as an executable or other copy of a program to be executed, an indication of a program that was previously registered or otherwise supplied for execution, and a number of instances of the program that are to be executed simultaneously (e.g., expressed as a single desired number of instances, as a minimum and maximum number of desired instances, etc.), as well as a variety of other types of preferences and/or requirements for execution of one or more programs (e.g., resource allocation, geographical and/or logical location for execution, proximity of execution to other programs and/or computing nodes, timing-related criteria, etc.).

After receiving a request to execute one or more instances of a program at an indicated time, the PES may determine one or more computing nodes to use in executing the program instances. In some embodiments, the determination of the computing nodes to be used is performed at the time of the request even if for future execution. In other embodiments, the determination of the computing nodes to be used for future execution of one or more program instances may be deferred to a later time, such as at the future time of execution based on information that is then available. In some embodiments, the determination of which computing nodes to use for execution of one or more programs on behalf of a user may be made prior to a request to execute, such as at a time when a user subscribes and/or registers to use the PES, and/or at another time prior to a request to execute programs for a user. For example, in some such embodiments, one or more computing nodes may be associated with a user for a period of time, such that programs may be executed on behalf of that user on the associated computing nodes at any time during that period, such as at any time a request is received to execute software for the user during the period. In addition, in some embodiments, the determination of which computing nodes to use to execute programs on behalf of a user may be made when one or more computing nodes and/or computing resources of one or more computing nodes become available for executing programs for the user, such as, for example to execute programs of one or more pending requests on one or more computing nodes at a time when the computing nodes are unused and/or are otherwise available for executing the programs.

The determination of which computing nodes to use for execution of each program instance may be made in a variety of ways, including based on any preferences and/or requirements specified in the request or otherwise specified for the program and/or associated user (e.g., at a time of registration, etc.). For example, if criteria are determined for preferred and/or required resources for execution of a program instance (e.g., memory and/or storage; CPU type, cycles or other performance metric; network capacity; platform type, etc.), the determination of an appropriate computing node to execute a program instance may be based at least in part on whether a computing node has sufficient resources available to satisfy those resource criteria. Additional details related to executing and configuring programs to execute on a program execution service are included in pending U.S. patent application Ser. No. 11/395,463, filed Mar. 31, 2006 and entitled "Managing Execution of Programs by Multiple Computing Systems," which is hereby incorporated by reference in its entirety.

In addition, as previously noted, in at least some embodiments, execution of a program using excess program execution capacity that is automatically terminated may be automatically reinitiated at a later time by the PES. For example, in some such cases, the PES may continue to try to execute a program until completion of the requested execution (e.g., until cancelled or otherwise explicitly terminated by a user, until an indication is received that the one or more programs have completed one or more tasks, etc.), until occurrence of a specified time (e.g., until occurrence of an expiration time, until occurrence of a cumulative execution time, etc), until occurrence of a specified number of executions, indefinitely, etc.

In some embodiments, fees may be associated with the use of a PES, such that the PES may execute programs on behalf of a user in exchange for payment of one or more fees by that user. For example, in some embodiments, fees may be charged to a user based on an amount and/or type of program execution capacity allocated for executing one or more programs on behalf of a user, such as based on one or more of a number of processing units, an amount of memory, an amount of storage, an amount of network resources, etc., allocated for executing programs of the user. In some embodiments, fees may be based on other factors, such as various characteristics of the computing resources used to execute programs, such as, for example, based on CPU capabilities or performance, platform type (e.g., 32-bit, 64-bit, etc.), etc. In some embodiments, fees may be charged on the basis of a variety of use factors, such as a price per use of the service, a price per unit of time that computing services are used, a price per storage used, a price per data transferred in and/or out, etc. In at least some embodiments, as discussed in more detail below, fees may be based on various other factors, such as related to availability of the program execution capacity (e.g., varying degrees of availability, such as guaranteed availability and/or variable availability) and/or various properties related to executing programs (e.g., continuity of execution, fault tolerance, etc.). In at least some embodiments, a provider of a PES may offer one or more of various tiers, types and/or levels of services or functionality for executing programs on behalf of multiple users, and in some such embodiments, various fees may be associated with the various tiers, types and/or levels of services. For example, in some embodiments, a user may be charged one or more fees in conjunction with use of dedicated program execution capacity functionality provided by a PES, such as fees that are respectively lower than fees associated with comparable use of an on-demand variable program execution capacity service of the PES. The lower fees may reflect, for example, the user entering into a long-term agreement for a specified use time period (e.g., a number of weeks, months, years, etc.), such as to pay one or more specific rates over the term of the agreement (e.g., up front and/or periodically). In addition, for example, tiers may be used for a specific type of functionality provided by a PES, such as to charge fees at a first tier for a first quantity of dedicated program execution capacity functionality (e.g., up to a specified first threshold of computing nodes being used), to charge fees at a second tier (e.g., a lower price tier) for a second quantity of dedicated program execution capacity functionality (e.g., above the specified first threshold and up to a specified second threshold of computing nodes being used), etc. Tiers may further be based on various factors other than quantity of functionality that is used in at least some embodiments, whether instead of or in addition to being based on quantity of functionality used. Additional details related to various fees associated with a program execution service are included in pending U.S. patent application Ser. No. 11/963,331, filed Dec. 21, 2007 and entitled "Providing Configurable Pricing for Execution of Software Images," which is hereby incorporated by reference in its entirety.

A use time period for a period of dedicated computing capacity may be specified in various manners in various embodiments, such as to indicate a specified period of time in which a user has access to dedicated program execution capacity (e.g., a number of days, weeks, months, years, etc.), a duration of time in which one or more programs may be continuously executed for a user (e.g., a number of hours the one or more programs may execute within any given period, such as an hour a day, an hour a week, etc.), a window of time in which one or more programs may execute (e.g., between 1:00 p.m. and 3:00 p.m. every other day), etc. As previously noted, in some embodiments an electronic marketplace may be provided for users of a PES, such that dedicated program execution capacity users may provide some or all of their specified use time period for dedicated program execution capacity to one or more other users in exchange for payment from those one or more other users, such that the one or more other users may use the provided portions of dedicated program execution capacity to execute programs on behalf of the one or more other users, and the dedicated program execution capacity user may receive payment for such use. In other embodiments, a dedicated program execution capacity user may temporarily provide use of some portion of her dedicated program execution capacity for use by one or more users based in part on the one or more other users having an urgent need of the program execution capacity, such as indicated by a willingness of the one or more users to pay a premium for use of the dedicated program execution capacity (e.g., a rate greater than that paid by the dedicated program execution capacity user), and in at least some such embodiments a portion and/or all of the fees collected from the one or more users may be provided to the dedicated capacity user.

Furthermore, various other types of functionality may be provided and used by a PES in various embodiments, as discussed in greater detail elsewhere.

Figure 3:
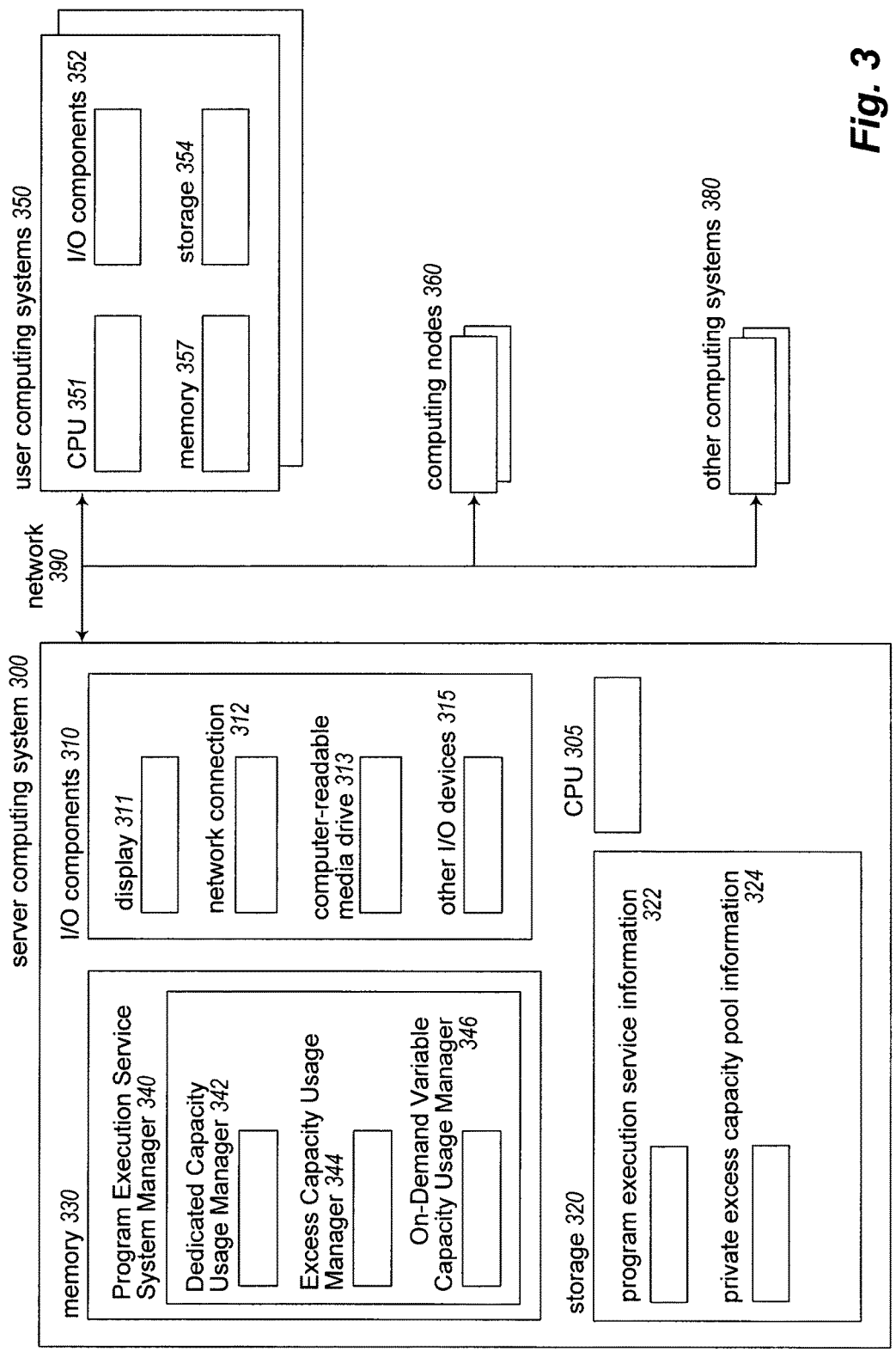
FIG. 3 is a block diagram illustrating an example embodiment of a computing system for managing use of computing nodes by multiple users.

FIG. 3 is a block diagram illustrating an example embodiment of a system suitable for performing techniques to manage use of computing nodes by multiple users. In particular, FIG. 3 illustrates a server computing system 300 suitable for executing an embodiment of a Program Execution Service System Manager module, as well as various user computing systems 350, computing nodes 360, and other computing systems 380. In the illustrated embodiment, the server computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 have components similar to those of server computing system 300, including a CPU 351, I/O components 352, storage 354, and memory 357, although some details are not illustrated in this example for the sake of brevity. The other computing systems 380 and computing nodes 360 may also each include similar components to some or all of the components illustrated with respect to server computing system 300, but such components are not illustrated in this example for the sake of brevity.

An embodiment of a Program Execution Service System Manager module 340 is executing in memory 330, and it interacts with computing systems 350 and 380 and computing nodes 360 over the network 390 (e.g., via the Internet and/or the World Wide Web, via a private cellular network, etc.). In this example embodiment, the PESSM 340 may, for example, include software instructions that when executed program one or more processors (e.g., CPU 305) to perform some or all of the described techniques, including functionality related to managing use of multiple computing nodes 360 by various users (not shown) interacting with user computing systems 350, such as in conjunction with a program execution service managed by the PESSM 340. The other computing systems 350 and 380 and computing nodes 360 may be executing various software as part of interactions with the PESSM. For example, user computing systems 350 may be executing software in memory 357 to interact with PESSM 340 (e.g., as part of a Web browser or specialized client-side application program), such as to configure and/or request execution of programs on behalf of the users of those systems on one or more computing nodes 360 in various ways, such as related to variable execution capacity use, dedicated execution capacity use, and/or excess execution capacity use. In addition, one or more users of the user computing systems 350 may interact with PESSM 340 to perform various other types of actions, as discussed in greater detail elsewhere. Various information related to the functionality of the PESSM module 340 may be stored in storage 320, such as information 324 related to private excess capacity pools (e.g., tracked current availability, user instructions related to configuration and/or other configuration information, etc.) and other information 322 (e.g., information related to configuration, execution and/or registration for executing programs on behalf of multiple users).

Figure 5A:
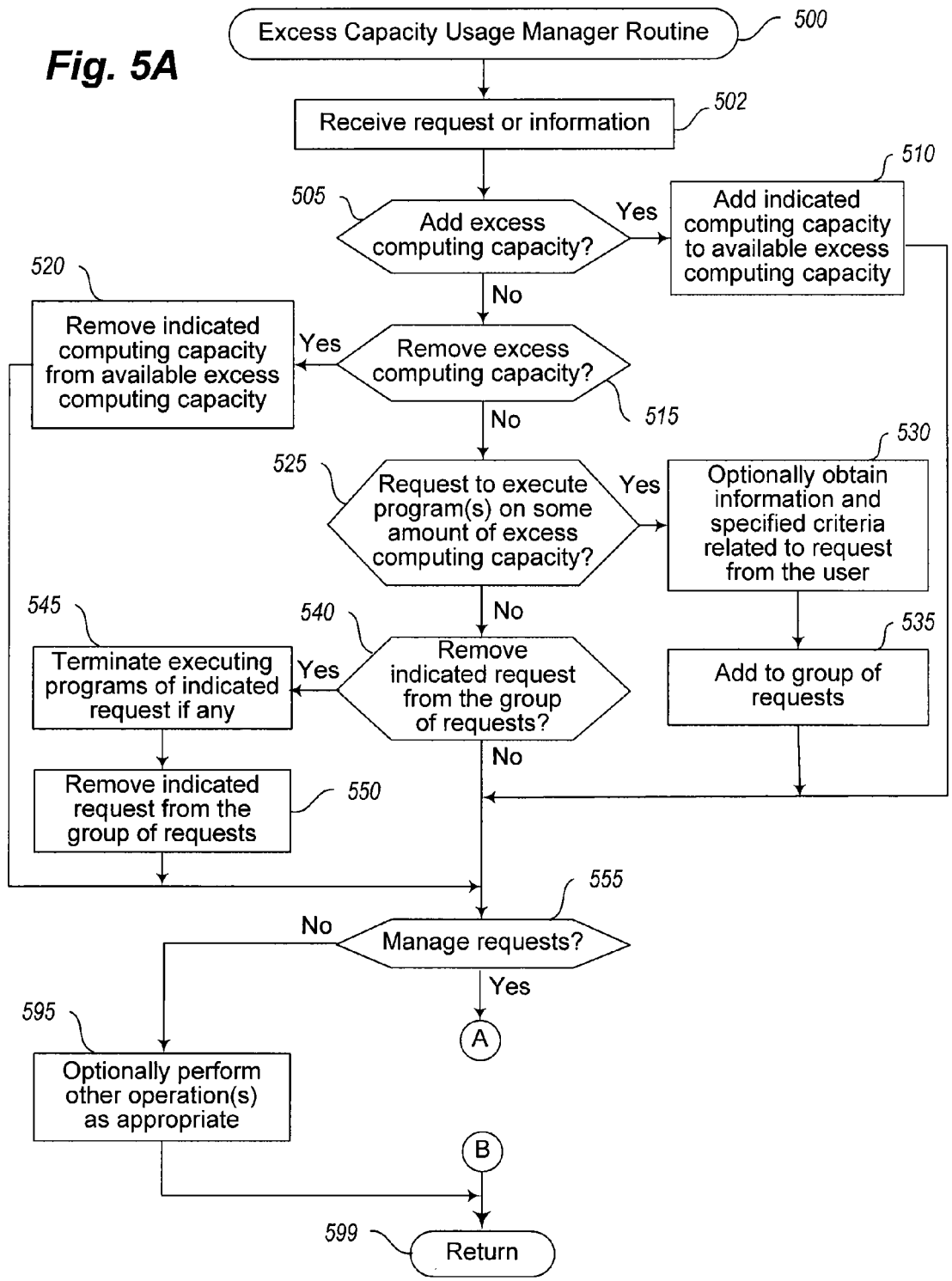

In this example, the PESSM module 340 includes three constituent modules, including a Dedicated Capacity Usage Manager module 342, an Excess Capacity Usage Manager module 344, and an On-Demand Variable Capacity Usage Manager module 346. The Dedicated Capacity Usage Manager module 342 manages the use of dedicated computing capacity by users, with FIG. 6 illustrating a routine corresponding to operations of the module 342 in one example embodiment. The Excess Capacity Usage Manager module 344 manages the use of general and private excess computing capacity pools by users, with FIGS. 5A and 5B illustrating a routine corresponding to operations of the module 344 in one example embodiment. The On-Demand Variable Capacity Usage Manager module 346 manages the use of on-demand variable computing capacity by users, with FIG.

7 illustrating a routine corresponding to operations of the module 346 in one example embodiment. In other embodiments, the functionality provided by the PESSM module 340 may be structured in other manners, including to optionally not include one or more of the constituent modules 342-346 (e.g., to not include the On-Demand Variable Capacity Usage Manager module 346 for an embodiment that does not provide on-demand variable capacity usage).

After the PESSM module 340 receives a request (or other indication) to execute one or more programs on one or more computing nodes 360, the PESSM module 340 determines a constituent module 342-346 that corresponds to the indicated type of program execution capacity to use, and forwards the request to the determined constituent module. The determined constituent module and the PESSM module 340 then perform various operations to respond to the request, such as selecting the one or more computing nodes that will execute the one or more programs, and initiating execution of those programs on those computing nodes 360. In addition, the PESSM module 340 (including constituent modules 342-346) may further perform operations to interact with computing nodes 360 to terminate execution of initiated programs on the computing nodes, to migrate one or more of the programs to one or more other computing nodes 360 or computing systems 380, to monitor or otherwise interact with one or more of the computing nodes 360 to track use of those computing nodes, etc. The computing nodes 360 may have various forms in various embodiments, such as to include a number of physical computing systems and/or a number of virtual machines executing on one or more physical computing systems. In some embodiments, the server computing system 300 and computing nodes 360 may be part of a data center or other group of co-located computing systems, or may otherwise be computing nodes of a private network. In addition, in some embodiments, the PESSM module 340 may interact with one or more other computing systems 380 to initiate or terminate execution of one or more programs on those computing systems, such as if the computing systems 380 are provided by one or more third-party participants who are providing excess program execution capacity for use by other users. In some embodiments, the PESSM module 340 may further or instead manage access to one or more types of computing-related resources or services other than program execution services (e.g., persistent or temporary data storage services, messaging services, database services, etc.).

It will be appreciated that computing systems 300, 350 and 380 and computing nodes 360 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system may comprise any combination of hardware or software that may interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated PESSM module 340 and its constituent modules may in some embodiments be distributed in additional modules or combined in fewer modules. Similarly, in some embodiments, some of the functionality of the PESSM module 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software PESSM module 340 and/or constituent modules may execute in memory on another device and communicate with the illustrated computing systems via inter-computer communication. Furthermore, in some embodiments, some or all of the PESSM module 340 and/or constituent modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules and data structures may also be stored (e.g., as software instructions or structured data) on a computer-readable medium, such as a hard disk, a memory, a network, or a portable media article to be read by an appropriate drive or via an appropriate connection. The modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
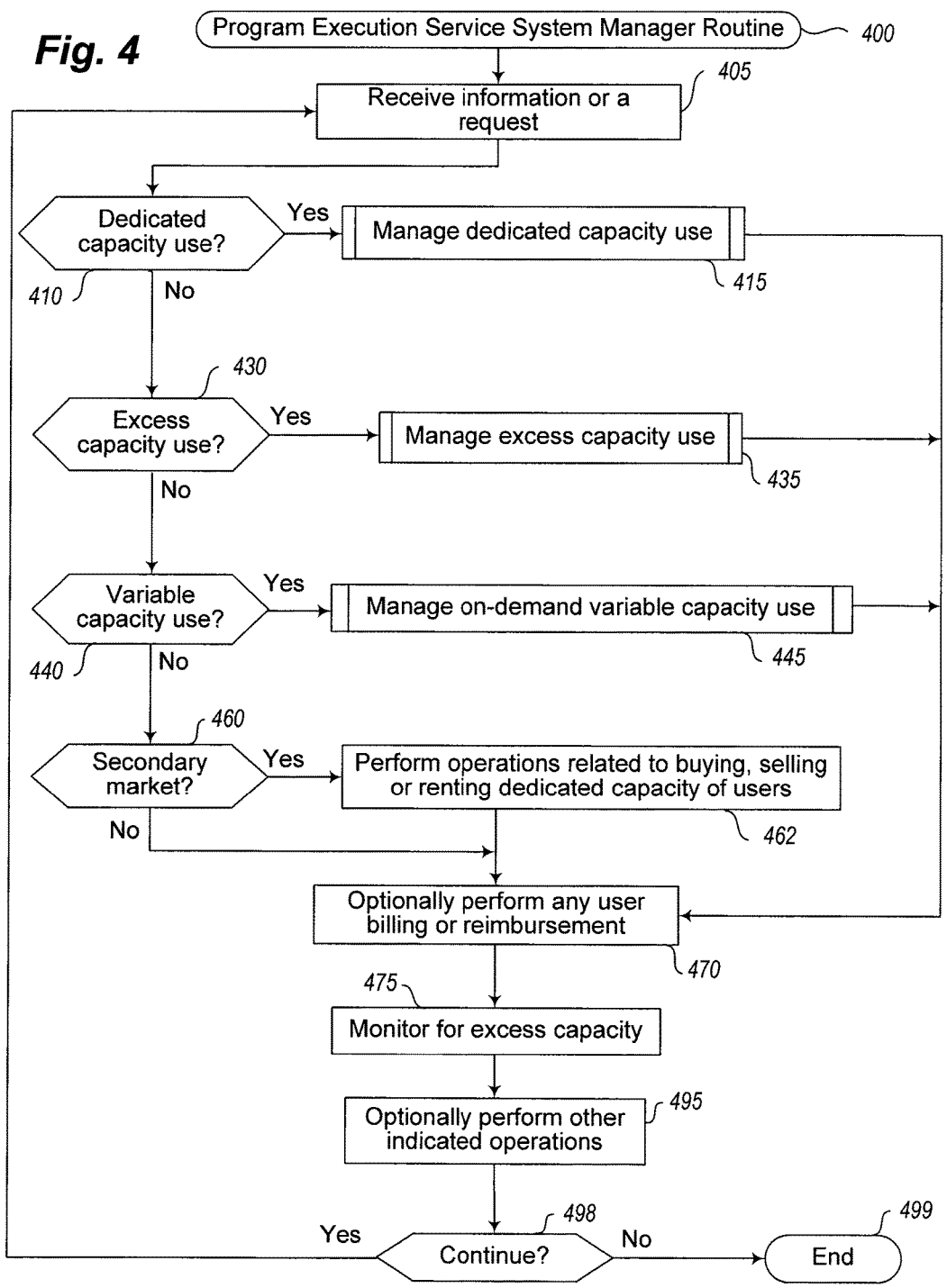
FIG. 4 illustrates a flow diagram of an example embodiment of a Program Execution Service System Manager routine.

FIG. 4 is a flow diagram of an example embodiment of a Program

Execution Service System Manager routine 400. The routine may be provided by, for example, execution of the PESSM modules 110 and 180 of FIGS. 1A and 1B, respectively, a PESSM module (not shown) that performs operations corresponding to FIGS. 2A and 2B, and/or the PESSM module 340 of FIG. 3, such as to assist in managing use of multiple computing nodes and/or other types of program execution capacity, as well as to perform other types of management operations in some situations. In this illustrated embodiment, the routine 400 manages various aspects of use of a program execution service that provides program execution capacity for executing programs on behalf of multiple users.

In the illustrated embodiment, the routine begins at block 405, where information or a request is received. The routine continues to block 410 to determine if the received request or information is related to dedicated capacity use. If so, the routine continues to block 415 to perform a routine related to managing dedicated computing capacity usage, with one example embodiment of such a routine being discussed in greater detail with respect to FIG. 6. If it is instead determined at block 410 that the information or request of block 405 is not related to dedicated capacity use, the routine continues to block 430 to determine if the information or request is related to excess computing capacity use. If so, the routine continues to block 435 to perform a routine related to managing excess computing capacity usage, with one example embodiment of such a routine being discussed in greater detail with respect to FIGS. 5A-5B. If it is instead determined at block 430 that the information or request of block 405 is not related to excess capacity use, the routine continues to block 440 to determine if the information or request is related to on-demand variable computing capacity use. If so, the routine continues to block 445 to perform a routine related to managing on-demand variable computing capacity usage, with one example embodiment of such a routine being discussed in greater detail with respect to FIG. 7.

If it is instead determined at block 440 that information or a request related to variable capacity use is not received, the routine continues to block 460 to determine if the information or request is related to a secondary dedicated capacity market, and if so, the routine continues to block 462 to perform one or more indicated operations as appropriate related to a secondary dedicated capacity market. For example, in various embodiments, such operations may include one or more of indications from dedicated capacity users to sell and/or rent various amounts of the users' dedicated program execution capacity, indications from one or more other users to buy and/or rent program execution capacity from dedicated capacity users, indications from one or more urgent users who may be willing to pay a premium for various amounts of program execution capacity, etc.

After blocks 415, 435, 445 and 462, or if it is instead determined in block 460 that information or a request related to a secondary dedicated capacity market is not received, the routine continues to block 470 to optionally perform any user billing or reimbursement activities based on the information or request received in block 405 or as is otherwise initiated (e.g., periodically), such as to charge and/or collect fees from one or more users (e.g., dedicated capacity users, variable capacity users, excess capacity users, and/or others) based on program execution functionality provided to the users, and/or to pay and/or reimburse one or more users (e.g., dedicated capacity users and/or others who provided computing resources for use by excess capacity users, etc.) for functionality provided by or enabled by the users.

After block 470, the routine continues to block 475 to optionally monitor for excess program execution capacity for any general excess computing capacity pools and private excess computing capacity pools in use, such that program execution capacity may be added and/or removed from the excess program execution capacity available for use by one or more excess capacity users. In other embodiments, the routine may receive other indications of current and/or expected usage of program execution capacity, such as notifications from one or more computing resources of the program execution service (e.g., such as computing nodes with resident monitors that may indicate current usage status), notifications from one or more users, and/or may otherwise determine when computing resources are and/or are likely to be used, unused, or underutilized.

Next, the routine continues to block 495 to optionally perform one or more other indicated operations. In some embodiments, such operations may include configuring use of various resources and/or functionality of the program execution service for users, subscription or registration operations, scheduling operations, etc. After block 495, the routine continues to block 498 to determine whether to continue, such as until an explicit indication to terminate execution of the routine is received. If so, the routine returns to block 405, and if not, the routine continues to block 499 and ends.

FIG. 6 is a flow diagram of an example embodiment of a Dedicated Capacity Usage Manager routine 600. The routine may be provided by, for example, execution of the Dedicated Capacity Usage Manager module 342 of the PESSM module 340 of FIG. 3, or as part of the PESSM modules 110 and 180 of FIGS. 1A and 1B, respectively, and/or a PESSM module (not shown) that performs operations corresponding to FIGS. 2A and 2B, and may be initiated from block 415 of routine 400 in FIG. 4, or otherwise invoked.

In the illustrated embodiment, the routine 600 begins at block 605, where a request, information and/or other indication related to dedicated capacity use is received. At block 612, the routine then determines whether a request has been received from a user to subscribe for use of dedicated program execution capacity. If so, the routine continues to block 614 where corresponding information is obtained from a subscribing user, and various operations related to subscribing for use of dedicated program execution capacity are performed. For example, in some embodiments, a user may select and/or indicate one or more computing nodes to which the user would like dedicated access. As discussed elsewhere, in some embodiments, a user may select from one or more of various types of computing nodes and/or may otherwise specify various amounts and/or types of computing resources desired (e.g., processing unit type/amount, memory amount, platform specification, etc.). In addition, a subscribing user may also indicate a desired time period of use over which the user would like dedicated access (e.g., a number of hours, weeks, months, years, etc.), and/or may provide other information (e.g., billing information, indications of programs to execute on behalf of the user, scheduling information for executing one or programs at one or more future times, etc.). After the subscriber provides information related to a type and/or amount of desired dedicated program execution capacity, the routine continues to block 616 where an appropriate amount of requested program execution capacity is allocated for dedicated use by the subscribing user if possible. As discussed elsewhere, program execution capacity (e.g., one or more computing nodes) may be allocated and/or assigned for use by a particular subscribing dedicated capacity user in various ways in various embodiments.

After block 616, the routine continues to block 618 to optionally determine whether to use at least some of the computing capacity allocated to the subscriber for dedicated use as part of a private pool of excess computing capacity for use by the subscriber (and/or by other designated users), and if so to store corresponding information to enable use of the private excess computing capacity pool. For example, in some embodiments, private excess computing capacity pools may be enabled and used for decided capacity subscriber users, such that all dedicated computing capacity that is allocated to such a user may be made available for possible later use in a private excess computing capacity pool for that user while that dedicated computing capacity is not otherwise being used by the user. Alternatively, the PESSM module may in some embodiments create such private excess computing capacity pools for all dedicated capacity users by default unless otherwise instructed. In other embodiments, such a private excess computing capacity pool for a dedicated capacity user may not be created in block 618 unless the user provides explicit instructions to do so, and/or other predetermined criteria are satisfied. In yet other embodiments, the determination of whether to create such a private excess capacity pool for a user may instead be performed at other times, such as upon receiving a request from such a dedicated capacity user to use excess computing capacity resources. Furthermore, in at least some embodiments, the subscriber user may configure other aspects of such a private excess computing capacity pool for the user, such as how much of the dedicated capacity use is to be available as part of the private excess capacity pool (e.g., all, a specified percentage or specified number of computing nodes, etc.), to what users the private excess capacity pool is to be available, certain time periods and/or other criteria during which the private excess capacity pool is to be available or not available, etc.

If it is instead determined at block 612 that a request to subscribe for use of dedicated program execution capacity is not received, the routine instead continues to block 630, where the routine determines whether a request is received to execute one or more programs on behalf of a subscriber user on allocated dedicated program execution capacity (e.g., a current request for immediate execution, a previously scheduled request for execution, etc.), and that the corresponding dedicated program execution capacity is not already in use or scheduled for use for other dedicated program execution. If sufficient dedicated program execution capacity is not available, an error message or other similar response is provided, such as with respect to block 635. In some embodiments, the routine may also ensure that the request for execution has been received within an appropriate use period and/or may otherwise authorize the request (e.g., authenticate the request, authorize the subscriber user, etc.). If an appropriate request is received for use of dedicated capacity, the routine continues to block 640 to determine if the allocated dedicated program execution capacity to be used for the request is currently in use as part of fulfilling a prior request from the requester as part of a private excess computing capacity pool for the requester. If such current private excess computing capacity pool use is identified in block 645, the routine continues to block 650, and otherwise continues to block 660 to perform the requested execution, such as by initiating the execution of the one or more programs on the allocated program execution capacity. If the routine first proceeds to block 650 before block 660, the routine in block 650 initiates a transfer of the prior request from the private excess computing capacity pool to a general excess computing capacity pool, since the private excess computing capacity pool no longer has current availability to fulfill the prior request, although in other embodiments and situations (e.g., based on instructions specified for the prior request), the routine may instead leave the prior request in a queue for the private excess computing capacity pool so that it is deferred until sufficient capacity becomes available in the private excess computing capacity pool. In some embodiments, as part of block 660, the routine may select computing resources and/or computing nodes on which to execute the programs in various ways, and in some situations the routine may terminate one or more programs of other users (e.g., general excess capacity pool users) and/or otherwise free computing resources to perform the requested execution. In some embodiments, if a dedicated capacity user previously supplied some amount of her allocated dedicated program execution capacity for use by one or more other users, such as to sell or lease that capacity to another user, then the dedicated capacity to fulfill the received request may not be available for use by the dedicated user at the time of the request, unless the user is able to reclaim the capacity for the request. In addition, in some embodiments, the current request from the subscriber user for the use of the dedicated capacity may be temporarily delayed, such as to allow a prior request from the subscriber user that is executing as part of a private excess capacity pool for the subscriber user to complete or otherwise perform one or more determined actions.

If it is instead determined at block 630 that a request to execute one or more programs on behalf of a subscribing user on allocated program execution capacity is not received, the routine continues to block 635 to optionally perform one or more other indicated operations related to dedicated capacity use as appropriate. For example, in some embodiments, such operations may include indicating some amount of dedicated program execution capacity to make available as excess program execution capacity, whether for a private excess capacity pool and/or a general excess capacity pool, and/or indicating that some amount of previously specified program execution capacity is to be reclaimed for use by the dedicated capacity user. In addition, as previously noted, the routine in block 635 may provide an error message or other related information if the request received in block 605 is not fulfilled. In addition, in some embodiments, a request or instruction may be received in block 605 to terminate previously initiated dedicated capacity use, and if so the routine in block 635 may perform such program termination and also update the corresponding private excess computing capacity pool (if any) or general excess computing capacity pool of the resulting available excess capacity—in other embodiments, the user may instead terminate the execution of the programs on the computing nodes without notifying the routine 600, and the PESSM module may later automatically identify the resulting excess computing capacity (e.g., with respect to block 475 of FIG. 4).

After blocks 618, 635 or 660, the routine continues to block 699 and returns.

FIGS. 5A-5B are a flow diagram of an example embodiment of an Excess Capacity Usage Manager routine 500. The routine may be provided by, for example, execution of the Excess Capacity Usage Manager module 344 of the PESSM module 340 of FIG. 3, or as part of the PESSM modules 110 and 180 of FIGS. 1A and 1B, respectively, and/or a PESSM module (not shown) that performs operations corresponding to FIGS. 2A and 2B, and may be initiated from block 435 of routine 400 in FIG. 4 or otherwise invoked.

In the illustrated embodiment, upon invocation of the routine 500, a request, information and/or other indication related to excess capacity use is provided to the routine at block 502. At block 505, the routine then determines whether an indication is received to add program execution capacity to available excess program execution capacity, such as based on information obtained with respect to block 475 of FIG. 4, or as triggered by the termination of use of dedicated computing capacity with respect to block 635 of FIG. 6. If so, the routine continues to block 510 to add the indicated program execution capacity to available program execution capacity. In particular, if the excess program execution capacity corresponds to a private excess computing capacity pool, then that private pool is selected to receive the indicated excess capacity, and otherwise a general excess computing capacity pool is selected. In addition, in some embodiments requests to create new private excess capacity pools may be received and handled with respect to block 510, or instead with respect to block 595 as discussed below. For example, in some embodiments, the routine may add one or more indications of such indicated program execution capacity (e.g., one or more particular computing nodes, etc.) to the selected pool of available program execution capacity. In some embodiments, multiple pools may be provided, as previously discussed with respect to private and general excess capacity pools, and/or in other manners (e.g., various different types of program execution capacity may be available and grouped into corresponding private and/or general pools associated with the type of program execution capacity).

If it is instead determined at block 505 that an indication to add excess program execution capacity is not received, the routine continues to block 515 to determine whether an indication is received to remove program execution capacity from the available excess program execution capacity. If so, the routine continues to block 520 to select a corresponding private and/or general excess capacity pool from which the excess capacity is to be removed (e.g., based on particular program execution capacity that is indicated, such as for one or more programs currently executing using excess capacity). The routine then removes the indicated program execution capacity from the available excess program execution capacity for the selected capacity pool, such that the indicated program execution capacity (or an equivalent amount of program execution capacity) is no longer available as excess program execution capacity to execute programs on behalf of excess capacity users for the selected capacity pool.

If it is instead determined in block 515 that an indication to remove program execution capacity from available program execution capacity is not received, the routine continues instead to block 525 to determine whether a request to execute one or more programs on some amount of available excess program execution capacity on behalf of an excess capacity user is received (or a previously scheduled request for such execution has been triggered). If so, the routine continues to block 530 to select a corresponding private and/or general excess capacity pool from which the excess capacity is to be obtained for executing one or more programs for the request (e.g., based on the excess capacity user, or instead on another indication of particular program execution capacity to use), and to optionally obtain or receive additional information from a requesting excess capacity user related to requested execution. In some embodiments, such additional information may include configuration information, such as indications of an amount and/or type of program execution capacity requested (e.g., including minimum and maximum amounts), a bid amount (e.g., including minimum and maximum bid amounts), an expiration time, a particular excess capacity pool to use (e.g., only a particular private excess capacity pool associated with the user, or to use a particular private excess capacity pool if available but to otherwise use a general excess capacity pool), etc. In some embodiments, some or all such additional information may instead be included as part of the request received in block 502, or as part of a separate configuration and/or registration performed by the excess capacity user. In addition, in some embodiments, the routine may provide feedback to an excess capacity user of one or more types, such as indicating likely characteristics of the requested execution (e.g., a likely time that the request will be executed, a likely duration of execution, a likely excess capacity pool to be used, etc.) and/or optional other information (e.g., suggested configurations). After block 530, the routine continues to block 535 to add the request to a group of current requests for execution on excess program execution capacity for the selected excess capacity pool to be used. In other embodiments, rather than add the request to a group of other requests, the routine may instead attempt to immediately satisfy the request, such as by determining whether there is available excess program execution capacity to execute the request at that immediate time (e.g., in a particular private excess capacity pool), and initiating execution of the programs if so, or taking other action if not (e.g., moving the request from the unavailable private excess capacity pool to a general excess capacity pool, failing, etc.).

If it is instead determined at block 525 that a request to execute programs on available excess program execution capacity is not received, the routine continues to block 540 to determine whether a request to remove an indicated previous request for execution is received (e.g., a indicated request for execution that was previously added to a group of requests at block 535), such as a request from an excess capacity user to cancel a current request for execution and/or a received indication that the request has otherwise expired, etc. If so, the routine continues to block 545 to terminate any programs associated with the indicated request that are currently executing on some amount of excess program execution capacity, and then continues to block 550 to remove the indicated request from one or more groups of requests that include the indicated request, such that the indicated request will not subsequently be considered for execution on excess program execution capacity.

After blocks 510, 520, 535 and 550, or if it was instead determined at block 540 that a request to remove an indicated request for execution is not received, the routine continues to block 555 to determine whether to manage current requests for execution on excess program execution capacity. For example, in some embodiments, indication received in block 502 may have been passed into the routine 500 to manage the requests and/or may have been provided based upon a change in the available program execution capacity (e.g., by adding to or removing from the available program execution capacity in blocks 510 and 520, respectively), and/or a change in the current request for execution (e.g., by adding or removing requests in blocks 535 and 550, respectively), etc. If so, the routine continues to block 560 to determine an amount of currently available excess program execution capacity for one or more private and/or general excess computing capacity pools in use, such as including an amount of program execution capacity added and/or removed from the available program execution capacity at blocks 510 and 520, respectively. After block 560, the routine continues to block 562 to select pending requests that may be executed using any available private excess computing capacity pools (e.g., immediately executed or executed during an upcoming time interval period), such as requests that are already being executed using a private excess capacity pool, requests that are queued for the private excess capacity pools, requests that are currently being executed using a general excess capacity pool but that have a corresponding private excess capacity pool that is preferred if it is available, requests that are currently being queued for a general excess capacity pool but that have a corresponding private excess capacity pool that is preferred if it is available, etc. For any such selected requests, the routine in block 560 then allocates a corresponding amount of excess computing capacity from the corresponding private excess computing capacity pool (or schedules such an allocation for an upcoming time interval period). The routine then continues to block 565 to, with respect to any remaining requests that are not selected in block 562, select other requests to be executed using one or more general excess computing capacity pools (e.g., immediately executed or executed during an upcoming time interval period), and allocate groups of the currently available excess program execution capacity from the corresponding general excess computing capacity pool(s) for use by those selected other requests.

As discussed in greater detail, the selection of requests in blocks 562 and 565 may be performed in various manners in various embodiments, including based at least in part on priorities associated with the requests and their users. For example, in some embodiments, the routine attempts to allocate an amount of the excess program execution capacity from a corresponding excess computing capacity pool to each request based on its request (e.g., a number of computing nodes specified, etc.). In some such embodiments, if there is sufficient currently available excess program execution capacity to satisfy all the current requests for execution for a particular excess computing capacity pool, then each of the requests will be allocated a requested amount of that excess program execution capacity for executing programs associated with the request. In cases where there is not sufficient currently available excess program execution capacity to satisfy all the current requests for a particular excess computing capacity pool, the routine prioritizes the requests and attempts to satisfy higher priority requests prior to lower priority requests. In various embodiments, priority may be based on one or more of a particular user associated with a private excess computing capacity pool, a bid amount, a time at which the request was received, etc. In various embodiments, the routine may determine which of the currently available excess program execution capacity to allocate for use by the requests in various ways, such as described elsewhere.

After block 565, the routine continues to block 570 to terminate any executing programs associated with a request that are already executing on excess program execution capacity but that were not selected for current execution in blocks 562 and 565, such as to reflect that the request has expired or was not sufficiently high priority to result in current ongoing satisfaction. In block 575, the routine then executes one or more programs associated with each of the requests (and/or leaves previously executing programs on excess program execution capacity that was selected for ongoing execution in block 565). After block 575, the routine continues to block 580 to optionally perform housekeeping operations. For example, in some embodiments, the routine may detect and indicate if there are any requests for execution in the group of requests that are expired or otherwise should be removed, or moved between excess computing capacity pools.

If it is instead determined at block 555 not to manage current requests for execution on excess program execution capacity, the routine continues to block 595 to optionally perform one or more other indicated operations as appropriate. For example, the request received in block 502 may be from a user to create a new private excess capacity pool for the user (e.g., based on using some or all of some dedicated capacity allocated to the user), such as in a manner similar to that discussed with respect to block 618 of FIG. 6, or to modify the configuration of an existing private excess capacity pool—if so, the routine may perform corresponding actions in block 595. After blocks 580 or 595, the routine continues to block 599 and returns.

Figure 7:
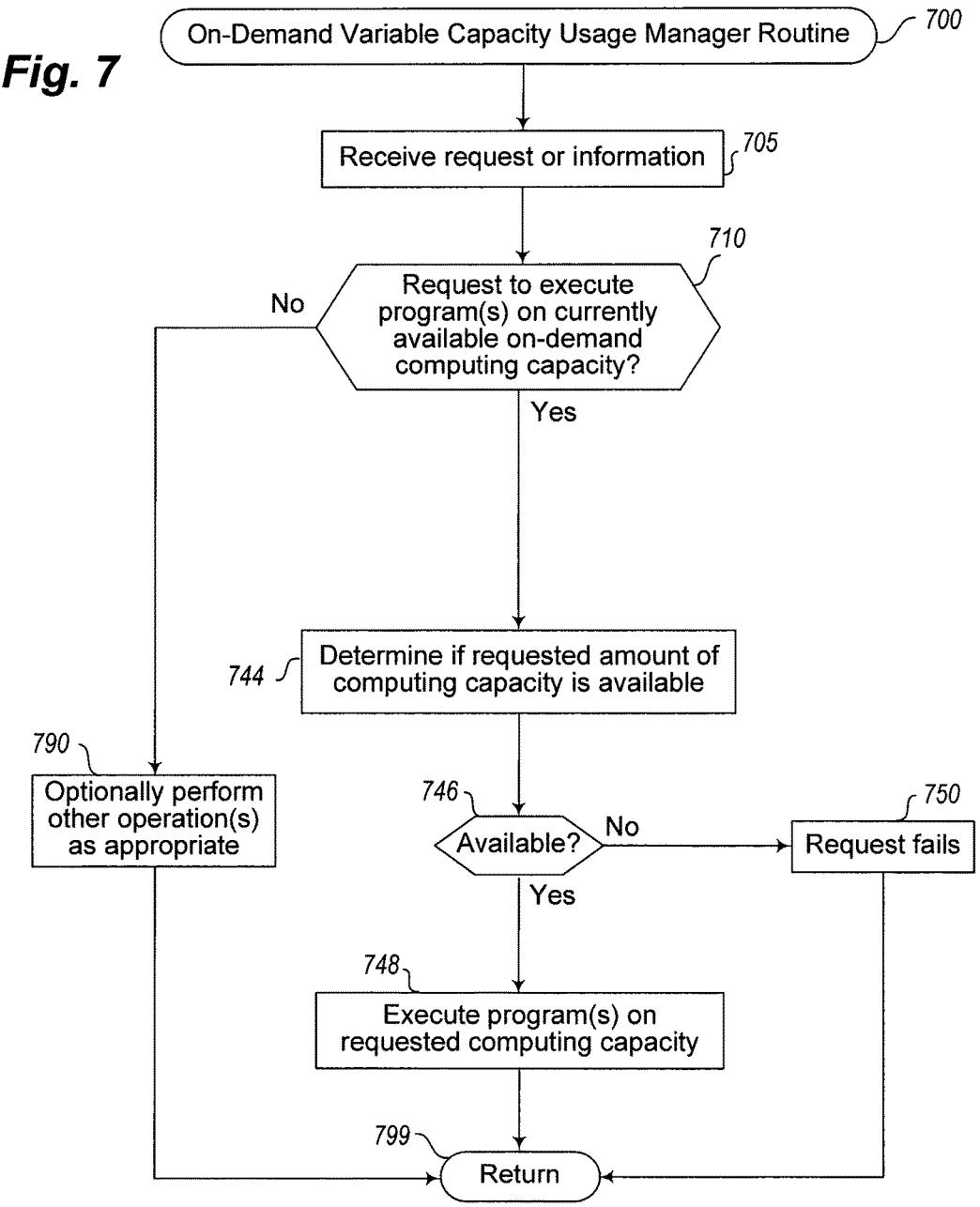
FIG. 7 illustrates a flow diagram of an example embodiment of an On-Demand Variable Capacity Usage Manager routine.

FIG. 7 is a flow diagram of an example embodiment of an On-Demand Variable Capacity Usage Manager routine 700. The routine may be provided by, for example, execution of the On-Demand Variable Capacity Usage Manager module 346 of the PESSM module 340 of FIG. 3, or as part of the PESSM modules 110 and 180 of FIGS. 1A and 1B, respectively, and/or a PESSM module (not shown) that performs operations corresponding to FIGS. 2A and 2B, and may be initiated from block 455 of routine 400 in FIG. 4, or otherwise invoked.

In the illustrated embodiment, the routine 700 begins at block 705, where a request, information and/or other indication related to on-demand variable capacity use is received. At block 710, the routine then determines if the request is to execute one or more programs on currently available on-demand variable computing capacity (e.g., a current request for immediate execution, a previously scheduled request, etc.). As discussed elsewhere, such a request may specify various types and/or amounts of program execution capacity on which to execute one or more programs on behalf of a variable capacity user. If it is determined in block 710 that a request to execute one or more programs is received, the routine continues to block 744. At blocks 744 and 746, the routine then determines whether the requested program execution capacity is currently available. If so, the routine continues to block 748 to initiate the execution of the one or more indicated programs on the available variable program execution capacity. If not, the routine continues to block 750, where the request for variable program execution capacity fails, such as by not executing the requested one or more programs. In other embodiments, other actions may optionally be taken in such situations, such as to query the user whether to move the request to a queue for use with excess computing capacity, or to instead automatically perform such a move in at least some embodiments and situations. In addition, in some embodiments, in response to a request to execute programs on variable program execution capacity, the routine may automatically terminate one or more programs of excess capacity users to free variable program execution capacity, such as by sending a corresponding request to an Excess Capacity Usage Manager module.

If it is instead determined in block 710 that a request to execute one or more programs is not received, the routine continues to block 790 to perform one or more other operations as appropriate. After blocks 748, 750 or 790, the routine continues to block 799 and returns.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention.

Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for managing execution of programs for users, the method comprising:
   receiving, by one or more programmed computing systems of a program execution service, instructions from a first user to execute a first program using indicated non-reserved program execution capacity that is not reserved by the program execution service for use of the first user;
   determining, by the one or more programmed computing systems, and in response to the received instructions to execute the first program using the indicated non-reserved program execution capacity, to instead execute the first program by using reserved program execution capacity that is reserved by the program execution service for use of the first user and that is separate from the indicated non-reserved program execution capacity;
   executing, based at least in part on the determining and by the one or more programmed computing systems, the first program on behalf of the first user by using the reserved program execution capacity;
   receiving, by the one or more programmed computing systems and during the executing of the first program using the reserved program execution capacity, a request from the first user to use the reserved program execution capacity of the first user to execute one or more second programs on behalf of the first user; and
   determining, by the one or more programmed computing systems and based at least in part on the received request, to terminate the use by the first program of the reserved program execution capacity, and to use the reserved program execution capacity to execute the one or more second programs on behalf of the first user.

2. The computer-implemented method of claim 1 wherein the determining to terminate the use by the first program of the reserved program execution capacity includes determining to terminate the executing of the first program.

3. The computer-implemented method of claim 2 wherein the method further comprises, based at least in part on the determining to terminate the executing of the first program, saving information related to an execution state of the first program and, after the saving of the execution state information, initiating termination of the executing first program.

4. The computer-implemented method of claim 3 wherein the indicated non-reserved program execution capacity is a general excess capacity pool of the program execution service, and wherein the method further comprises, after the initiating of the termination of the executing first program, causing an instance of the first program to be executed based on the saved execution state information using the general excess capacity pool of the program execution service.

5. The computer-implemented method of claim 4 wherein use of the general excess capacity pool of the program execution service has first program execution characteristics that differ from second program execution characteristics that occur from use of the reserved program execution capacity, and wherein the causing of the instance of the first program to be executed using the general excess capacity pool includes using the first program execution characteristics for the executing of the first program.

6. The computer-implemented method of claim 3 further comprising, after the initiating of the termination of the executing first program, determining to execute the first program using the saved execution state information and one or more computing-related resources of the reserved program execution capacity of the first user, the determining to execute the first program being based at least in part on the first user no longer using the one or more computing-related resources.

7. The computer-implemented method of claim 1 wherein the determining to terminate the use by the first program of the reserved program execution capacity includes determining to modify continuing execution of the first program to use computing-related resources of a general excess capacity pool of the program execution service that is distinct from the reserved program execution capacity of the first user.

8. The computer-implemented method of claim 1 wherein the determining to terminate the use by the first program of the reserved program execution capacity includes determining that the first program is within a defined threshold of completing execution and, based at least in part on the determining that the first program is within the defined threshold, further determining to allow the execution of the first program to be completed using the reserved program execution capacity.

9. The computer-implemented method of claim 1, further comprising determining to respond to the request received from the first user by using, for execution of the one or more second programs, computing-related resources of a general excess capacity pool of the program execution service that is distinct from the reserved program execution capacity of the first user.

10. The computer-implemented method of claim 9 wherein the using of the computing-related resources of the general excess capacity pool of the program execution service for the execution of the one or more second programs is performed without knowledge of the first user.

11. The computer-implemented method of claim 1 wherein the received request includes an indication of a quantity of multiple computing nodes to use for executing the one or more second programs, wherein an available quantity of one or more computing nodes associated with the reserved program execution capacity for the first user is less than the indicated quantity, and wherein the method further comprises, responsive to receiving the request, initiating execution of the one or more second programs by using unused excess capacity of the program execution service that includes a quantity of one or more unused excess computing nodes that corresponds to a numerical difference between the indicated quantity and the available quantity.

12. The computer-implemented method of claim 1 wherein the reserved program execution capacity is based on use of one or more reserved computing nodes for the first user that are a subset of a plurality of computing nodes of the program execution service, wherein the plurality of computing nodes include, for each of multiple physical computing systems, multiple virtual machines hosted by the physical computing system that are each configurable to execute at least one program, and wherein the one or more reserved computing nodes are each hosted virtual machines.

13. A non-transitory computer-readable storage medium having stored contents that cause one or more programmed computing systems of a program execution service to perform a method comprising:

receiving, by the one or more programmed computing systems of the program execution service, a first request from a first user to execute a first program using one or more indicated computing-related resources providing non-reserved program execution capacity that is not reserved for use of the first user;

determining, by the one or more programmed computing systems, and in response to the received first request to execute the first program using the one or more indicated computing-related resources providing the non-reserved program execution capacity, to instead execute the first program by using reserved program execution capacity that is reserved by the program execution service for use of the first user;

executing, by the one or more programmed computing systems and based at least in part on the determining, the first program using one or more further computing-related resources that are providing the reserved program execution capacity that is reserved for use of the first user;

receiving, by the one or more programmed computing systems and during the executing of the first program using the reserved program execution capacity, a second request to use the reserved program execution capacity of the first user to execute a distinct second program on behalf of the first user; and determining, by the one or more programmed computing systems and based at least in part on the received second request, to terminate the use by the first program of at least some of the reserved program execution capacity, and to use the at least some reserved program execution capacity to execute the distinct second program on behalf of the first user.

14. The non-transitory computer-readable medium of claim 13 wherein the determining to terminate the use by the first program of the at least some reserved program execution capacity includes obtaining information related to an execution state of the first program and determining to terminate the executing of the first program after the execution state information is obtained.

15. The non-transitory computer-readable medium of claim 14 wherein the method further comprises using the obtained execution state information to initiate an instance of the first program using excess program execution capacity of the program execution service that is distinct from the reserved program execution capacity of the first user.

16. The non-transitory computer-readable medium of claim 15 wherein the executing of the first program using the reserved program execution capacity of the first user is associated with a first fee incurred for use of a specified amount of the reserved program execution capacity for a specified time interval, and wherein the instance of the first program initiated using the excess program execution capacity of the program execution service is associated with a distinct second fee incurred for use of the specified amount of the excess program execution capacity for the specified time interval.

17. The non-transitory computer-readable medium of claim 14 wherein the method further comprises, after determining to terminate the executing of the first program, determining to initiate an instance of the first program using the obtained execution state information and other reserved program execution capacity of the first user that is separate from the at least some reserved program execution capacity of the first user, the determining to initiate the instance of the first program being based at least in part on the first user no longer using the other reserved program execution capacity.

18. The non-transitory computer-readable medium of claim 13 wherein the determining to terminate the use by the first program of the at least some reserved program execution capacity includes determining to continue the execution of the first program using excess program execution capacity of the program execution service that is distinct from the reserved program execution capacity of the first user.

19. The non-transitory computer-readable medium of claim 13 wherein the determining to terminate the use by the first program of the at least some reserved program execution capacity includes determining to perform the terminating after allowing at least some of the execution of the first program to be completed using the one or more further computing-related resources based at least in part on the first program being within a defined threshold of completing the at least some execution.

20. The non-transitory computer-readable medium of claim 13 wherein the method further comprises determining to respond to the second request by further using, for some of the execution of the distinct second program, excess program execution capacity of the program execution service that is distinct from the reserved program execution capacity of the first user.

21. A computing system configured to manage execution of programs, comprising:

one or more processors; and one or more memories with stored instructions of a system manager that, when executed by at least one of the one or more processors, cause the computing system to provide functionality of a remote service, including to at least:

receive a user request to execute a first program on behalf of a first user of the remote service by using non-reserved computing-related resources that are not reserved by the remote service for use of the first user;

determine, in response to the user request, to initiate execution of the first program on behalf of the first user by instead using reserved computing-related resources that are reserved by the remote service for use of the first user, and execute the first program on behalf of the first user by using the reserved computing-related resources;

receive user instructions to use, during the executing of the first program using the reserved computing-related resources of the first user, the reserved computing-related resources of the first user to execute one or more second programs on behalf of the first user; and determine, based at least in part on the received user instructions, to terminate the use by the first program of at least some of the reserved computing-related resources, and to use the at least some reserved computing-related resources to execute the one or more second programs on behalf of the first user.

22. The computing system of claim 21 wherein the stored instructions further cause the computing system to:

save information related to an execution state of the first program;

after the execution state information is saved, initiate termination of the executing first program; and initiate execution of an instance of the first program based on the saved execution state information.

23. The computing system of claim 21 wherein the stored instructions further cause the computing system to further use, for the executing of the one or more second programs, computing-related resources of the remote service that are distinct from the reserved computing-related resources.

\* \* \* \* \*